(12) United States Patent
Cho

(10) Patent No.: US 10,672,296 B2
(45) Date of Patent: Jun. 2, 2020

(54) DEVICE, TEACHING AID, AND PLATFORM FOR COMPUTING MATHEMATICS, AND THE METHOD FOR PROVIDING THE SAME

(71) Applicant: EQUALKEY CORP., Seoul (KR)

(72) Inventor: Bong Han Cho, Seoul (KR)

(73) Assignee: EQUALKEY CORP., Seoul (KR)

( * ) Notice: Subject to any disclaimer, the term of this patent is extended or adjusted under 35 U.S.C. 154(b) by 268 days.

(21) Appl. No.: 15/793,981

(22) Filed: Oct. 25, 2017

(65) Prior Publication Data

US 2018/0114464 A1 Apr. 26, 2018

(30) Foreign Application Priority Data

Oct. 26, 2016 (KR) .................. 10-2016-0139820
Nov. 11, 2016 (KR) .................. 10-2016-0150649
Mar. 3, 2017 (KR) .................. 10-2017-0027689

(51) Int. Cl.
*G09B 23/02* (2006.01)
*G09B 5/06* (2006.01)
*G09B 19/02* (2006.01)

(52) U.S. Cl.
CPC .............. *G09B 23/02* (2013.01); *G09B 5/06* (2013.01); *G09B 19/02* (2013.01)

(58) Field of Classification Search
CPC .......... G09B 23/02; G09B 5/06; G09B 19/00; G09B 19/02; G09B 23/00; G09B 7/00
See application file for complete search history.

(56) References Cited

U.S. PATENT DOCUMENTS

| 4,332,567 A | 6/1982 | Nogues |
| 5,820,381 A | 10/1998 | Dreyfous |
| 5,823,782 A * | 10/1998 | Marcus ............ G09B 1/06 434/156 |
| 9,128,661 B2 * | 9/2015 | Zilber ............ A63F 13/80 |

FOREIGN PATENT DOCUMENTS

| KR | 100458706 A | 12/2004 |
| KR | 20120024357 A | 3/2012 |
| KR | 101598428 A | 2/2016 |

* cited by examiner

*Primary Examiner* — Timothy A Musselman
(74) *Attorney, Agent, or Firm* — Loza & Loza, LLP; Thomas H. Ham

(57) ABSTRACT

The present invention relates to a device, a teaching aid, and a platform for computing mathematics, and the method for providing the same, which especially provides a method for making the meanings of mathematical equations intuitively and stereoscopically understood by computing various mathematics and expressing their processes with engraving objects (e.g., cube, block, etc.), a computing device/teaching aid for providing the method and the platform for providing various services through a mathematical computation using engraving objects. In particular, the teaching aid for computing mathematics provides a sequence board and a plurality of cubes which are arranged and rearranged on the sequence board, so that various mathematical problems and computing processes for the mathematical problems can be visually expressed in three-dimension and a user can intuitively understand the principles and solutions of the mathematical problems.

15 Claims, 14 Drawing Sheets

Operational procedure of mathematical computing processor using engraving objects Process of arranging engraving cubes used in multiplication for negative number

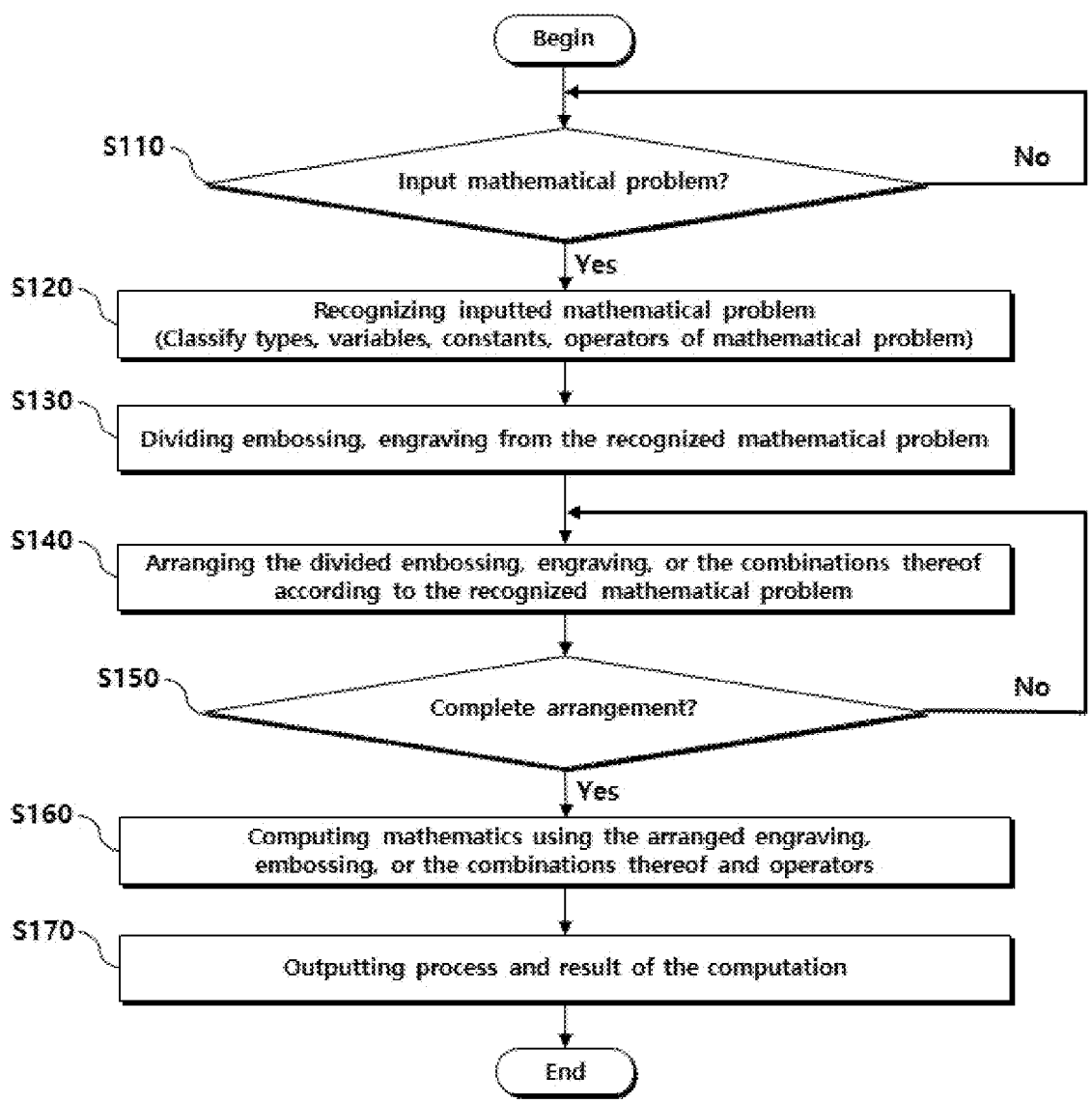

DEVICE, TEACHING AID, AND PLATFORM FOR COMPUTING MATHEMATICS, AND THE METHOD FOR PROVIDING THE SAME

BACKGROUND

In general, mathematics relates to numbers and quantities that start with counting and measuring things, may be the foundation of other disciplines such as science and economics, and has been one of the earliest developments in human history. And thus, mathematics has been used in whole social fields including social sciences such as natural sciences, engineering, medicine as well as economics, and it has become a basis for the development of each field.

Mathematics covers not only the concepts of quantities, structures, and spatial changes observed in the natural world, but also those that are not observed in the natural world. And mathematics makes it possible to generalize, abstract and quantify the above concepts, to explain their intrinsic properties, and to grasp the truth. And thus. learning mathematics is not just about computing numbers, but about learning how to think logically about the process of computing and solving complex and difficult problems and learning problem solving capabilities.

However, one of the common problems that most people who try to solve by applying mathematics to certain phenomena, including those who teach mathematics or learn mathematics, are suffering from, was that when learning mathematics, they were more at ease in solving each problem by simply memorizing solutions (ie, mathematical algorithms or mathematical formulas) that differ according to the problem rather than logical understanding of mathematical problems. Therefore, people want to solve problems by relying on mathematical algorithms or mathematical formulas they learned (memorized) in the past, so that when they are trying to solve new problems in the face of new phenomena, they often find it difficult to solve the problem because they can not find a fundamental solution principle.

Accordingly, the present invention intends to facilitate access to mathematical problems by introducing a board for representing a number sequence and a plurality of objects (e.g., embossing and engraving cubes, blocks) meaing numerals, and aims to visually and intuitively recognize the solution process and the solution principle of mathematical problems. Thus, the present invention provides a method, a device, a platform and a teaching aid for enabling logical and accurate understanding of mathematical problems by avoiding the existing drawbacks of simply memorizing solutions to mathematical problems.

Hereinafter, the prior arts related to the present invention of an aiding device (i.e., teaching aid) for teaching mathematics using cubes, blocks, or other tools are simply explained, and then the technical features that the present invention is differentiated from the prior arts will be described in detail as follows.

First of all, KR 0458706 B1 (Dec. 3, 2004) relates to a method for teaching mathematics using block diagrams, which uses a mathematical teaching material made up of light-transmissive rod diagram plate comprising a light-emitting diode having magnetic members and a magnet attached to the light-emitting diode, determines a unknown unit satisfying a given condition for a problem with respect to a problem made up of at least one object and a relation to the object, represents a condition for the object as a block diagram including the determined unknown unit, and performs a computation that satisfies the condition for the corresponding object. By doing so, it provides a mathematics teaching method using a block diagram, which allows the trainee to visually recognize the schematic of the condition or logical relationship of the problem.

The prior art provides a method of calculating a specific mathematical problem by schematizing the problem with a block diagram, and is related in part to the present invention in that it allows a user to visually approach mathematical problems and learn problem solving skills with ease. However, on the other hand, the present invention makes it possible to instantaneously recognize the number to be displayed using engraving cubes, and sequentially display the problem-solving process and the solution principle using the engraving cubes, thereby enabling a logical and accurate understanding of the mathematical problem.

Moreover U.S. Pat. No. 4,332,567 A (Jun. 1, 1982) relates to a mathematical teaching apparatus, which is used as a teaching aid for arithmetic, metric and analytical geometry and elementary algebra, and is formed by a cubic block array comprising a plurality of different size blocks arranged in rows and columns. The prior art allows expressions and computations of expressions using cube blocks of different sizes and combinations of the cube blocks.

The prior art proposes a tool for calculating mathematics using a cube block and relates to the present invention, which provides visually a mathematical computation and a mathematical teaching. However, the present invention utilizes engraving (engraving), emboss, or the combinations thereof to represent a number including a negative number sensuously so that it can be easily recognized. Moreover, the present invention utilizes a plurality of engraving cubes to allow sensuous recognition of large and small actual numbers, and at the same time, the present invention makes it easy to learn the solving process and the principle of the mathematical problem by using the respective engraving and emboss of the cubes. Thus, the above prior art can be said to be different from the present invention in the purpose, embodiment and effect.

Moreover, KR 1598428 B1 (Feb. 23, 2016) relates to a mathematical teaching aid, which arranges a plurality of model cards for performing numerical and arithmetic computations on a board on which a ruler, a grid plate, a stamper, and a vertical line are printed, thereby expressing a mathematical expression for a specific mathematical problem and computing mathematics.

The prior art has some similarities to the present invention in that it allows a mathematical computation to be performed using tools. However, the above prior art allows a user to learn arithmetic computations using the model card for arithmetic computation and the model card for numbers which have different in color by unit such as one-unit, ten-unit or hundreds-unit. Thus, the above prior art has limitations in expressing computational processes for complex mathematical problems such as sequences.

On the other hand, the present invention utilizes a sequence board to arrange or rearrange a plurality of cubes on the sequence board to express computing processes for various mathematical problems, and makes it possible to understand mathematical problems logically and intuitively by visually and intuitively recognizing the solving-processes and the solution principles of the mathematical problems. However, the prior art does not teach or suggest such technical configurations of the present invention.

As described above, most of the prior arts disclosed before filing of the present invention has simply utilized model cards or block diagrams to visually represent and calculate mathematical problems, and has not presented the technical features of the present invention, which utilizes a numerical sequence board, a plurality of cubes, and engraving cubes, enables the number representation to be sensibly and immediately recognized, visually represents various mathematical computations, and thus makes it possible to understand the meaning of the mathematical expression intuitively and stereoscopically.

SUMMARY

The present invention has been made in order to solve the above problems and it is an objective of the present invention to provide a method for enabling a sensuous and immediate recognition of the size, range, etc. of a number by expressing a number using at least one of engraving, embossing, or the combinations thereof.

It is another objective of the present invention to visually express a given mathematical problem using engraving and embossing cubes, so that a user can easily access the mathematical problem and more clearly recognize the principle of the mathematical problem.

It is another objective of the present invention to visualize computing process for a mathematical problem by using engraving cubes, thereby enabling a user to more clearly recognize a solution process and a solution principle of the mathematical problem, and thus to understand the mathematical problem logically and precisely.

It is another objective of the present invention to allow intuitive learning of mathematical concepts on the computation of a mathematical problem, number size, and the like by visually representing numbers and computing process of the mathematical problem through a plurality of embossing and engraving cubes.

It is another objective of the present invention to provide a teaching aid or a device including an electronic device, a learning tool, a computer program, a game tool, contents, and the like which implement a method of computing mathematics using engraving cubes.

It is another objective of the present invention to provide a teaching aid which enables sensuous and immediate recognition of the size, range, etc. of a number, by visually expressing a number using cubes including embossing cubes representing a positive number or engraving cubes representing a negative number.

It is another objective of the present invention to allow a user to easily access a mathematical problem, and to make it possible to more clearly recognize the principle of the mathematical problem by visually expressing the given mathematical problem using the plurality of cubes and a sequence board.

It is another objective of the present invention to provide various teaching aids for computing mathematical equations including a learning tool or a game tool, which comprises a sequence board for facilitating the computation of a mathematical problem by enabling a user to simplify the mathematical problem through the arrangement of at least one or more cubes.

It is another objective of the present invention to visualize computing processes of a mathematical problem involving a sequence through the processes of arranging or rearranging a plurality of cubes on a sequence board, and thus make it possible to understand a mathematical problem logically and accurately by allowing a user to intuitively and stereoscopically recognize mathematical concepts of solving process and solving principle of the mathematical problem, a size of a number, and the like.

According to an embodiment of the present invention to achieve the objectives described as above, a method for computing a mathematical problem using engraving objects comprises categorizing and arranging the mathematical problem with an engraving object, an embossing object, or the combinations thereof, and computing the mathematical problem by using the categorized and arranged engraving object, embossing object, or the combinations thereof. Wherein categorizing and arranging configured to classify the mathematical problem with embossing and engraving objects, and arrange the classified embossing and engraving objects according to rules corresponding to operators.

The method further comprises recognizing the mathematical problem as input and making the inputted mathematical problem available for computation before arranging the mathematical problem with an engraving object, an embossing object, or the combinations thereof. Wherein recognizing can be configured to classify a style of the mathematical problem, and categorize components of the mathematical problem which comprises a variable, a constant, an operator or the combinations thereof.

The method further comprises generating a multimedia contents comprising graphic, video, animation, voice, text or the combinations thereof, which expresses processes or results of computing the mathematical problem, and outputting the generated multimedia contents into visual information, auditory information, tactile information, electrical signal, or the combinations thereof.

The method can be configured to be executed by a device, wherein the device is made of paper, metal, wood, synthetic resin, or the combinations thereof; comprises a book, a block, a game machine, a learning machine, or the combinations thereof; and intuitively displays the principle of the mathematical computation used in the computational process of the mathematical problem by utilizing the engraving object.

According to another embodiment of the present invention to achieve the objectives described as above, a device for computing a mathematical problem using an engraving object comprises an input interface configured to input the mathematical problem, a mathematical computing processor configured to perform a mathematical computation for the inputted mathematical problem by using the engraving object; and an output interface configured to output the result of the mathematical computation, wherein the mathematical computation is to intuitively compute the mathematical problem by using the engraving object, the embossing object, or the combinations thereof.

Wherein the mathematical computing processor is configured to recognize the inputted mathematical problem and utilize the recognized results to the mathematical computation; categorize and arrange the recognized mathematical problem with the engraving object, the embossing object, or the combinations thereof; and compute the categorized and arranged mathematical problem by using the engraving object, the embossing object, or the combinations thereof.

Wherein recognizing the inputted mathematical problem is configured to classify a style of the mathematical problem, and categorize the components of the mathematical problem comprising variable, constant, operator or the combinations thereof, and wherein categorizing and arranging the recognized mathematical problem are configured to classify the mathematical problem into embossing and engraving objects, and arrange the classified embossing and engraving objects according to the rule corresponding to an operator of the mathematical computation.

The mathematical computing processor is configured to generate a multimedia contents comprising graphic, video, animation, voice, text or the combinations thereof, for processes or results computing the mathematical problem, and output the generated multimedia contents into visual information, auditory information, tactile information, electrical signal, or the combinations thereof.

According to another embodiment of the present invention to achieve the objectives described as above, a platform for computing a mathematical problem using an engraving object is configured to recognize the mathematical problem as input, and compute the mathematical computation for the recognized mathematical problem by using the engraving object; output the processes and results for the mathematical computation; and provide development environment to develop a mathematical computation service program using the engraving object through an application program interface, or provide a developed mathematical computation service.

According to another embodiment of the present invention to achieve the objectives described as above, a teaching aid for computing a mathematical problem using an engraving object, which comprises; a teaching aid configured to compute a mathematical computation for the mathematical problem using the engraving object, wherein the teaching aid is made of paper, metal, wood, synthetic resin, or the combinations thereof; comprises a book, a block, a game machine, a learning machine, or the combinations thereof; and intuitively displays the principle of the mathematical computation used in an computational process of the mathematical problem by utilizing the engraving object.

The teaching aid comprises at least more than one of cubes as objects; and a sequence board needed to perform the mathematical computation for the mathematical problem, wherein the mathematical problem is simplified through the arrangement of the cubes. Wherein the sequence board made up of EVA (ethylene vinyl acetate), ABS (acrylonitrile butadiene styrene), PVC (polyvinyl chloride), magnetic material, metal, wood, paper, plastic, or the combinations thereof.

Wherein the cubes comprise an embossing cube representing a positive number, and an engraving cube representing a negative number.

The teaching aid represents a number, size of a number or the combinations thereof represent the embossing cube, the engraving cube or the combinations thereof.

Simplifying the mathematical problem is performed through the arrangement and rearrangement of the cubes, wherein the arrangement is to place at least one or more cubes according to the given mathematical problem, and the rearrangement is to remove at least one or more arranged cubes on the sequence board or to add at least one or more arranged cubes on the sequence board.

The range of numbers that can be represented can be expanded by separating or combining the cubes, and arranging or rearranging the separated or combined cubes makes it possible to simplify the mathematical problem more easily than before separating or combining the mathematical problem, or simplify the mathematical problem that could not be simplified before separating or combining the cubes.

The sequence board is configured in that when the cube is placed on the sequence board, the cube is recognized as an embossing cube, and when the cube is taken out from the sequence board, the space where the cube is removed from the sequence board is recognized as an engraving cube.

The teaching aid further comprises an engraving board constructed to representing a negative number by picking out a cube from the engraving board in addition to the sequence board.

The sequence board is configured to comprise a cube array area for arranging cubes; a first block for adding or subtracting cubes in rows; a second block for adding or subtracting cubes individually; and a problem arranging area for expressing the presented mathematical problem.

According to another embodiment of the present invention to achieve the objectives described as above, a method for computing mathematics using a teaching aid for a mathematical computation comprises arranging cubes on a sequence board for a presented mathematical problem; and rearranging the arranged cubes; wherein rearranging the arranged cubes allows the presented mathematical problem to be simplified, and thus the method is configured to facilitate the computation of the mathematical problem.

Wherein rearranging the arranged cubes is further configured to be performed by removing or adding at least one or more than one of the arranged cubes from the sequence board.

The range of numbers that can be represented can be expanded by separating or combining the cubes; and arranging or rearranging the separated or combined cubes makes it possible to simplify the mathematical problem more easily than before separating or combining the mathematical problem, or simplify the mathematical problem that could not be simplified before separating or combining the cubes.

The method further comprises arranging and rearranging the cubes by placing the cubes so that the cubes are recognized as embossing cubes on the sequence board or another engraving board, or by pulling out the cubes so that the space in which the cube is removed from the sequence board or another engraving board is recognized as an engraving cube.

As described above, the present invention relates to a method for computing mathematics using engraving objects, a device and a platform for providing the mathematical computation, and has the effect of visually expressing numbers and mathematical computations using engraving objects so as to intuitively recognize concepts of numbers and solving processes and solving principles for the mathematical problems.

In addition, the present invention provides a device, a learning aid, a computer program, a game tool, contents, and the like that implement a method of computing a mathematical problem utilizing an engraving object, thereby having the effect of making it easier for anyone to understand the solution process and the solution principle of the mathematical problem.

Moreover, the present invention provides a service platform that allows a user to visually represent a numerical value and a mathematical computation using at least more than one of engraving objects, embossing objects, or the combination thereof, thereby having the effect of enabling development of various educational contents and game contents by developing an application program including the mathematical computation.

Moreover, the present invention relates to a teaching aid for a mathematical computation using a sequence board, and utilizes the sequence board and a plurality of objects (i.e., cubes, blocks, etc.) to intuitively and sensuously recognize a solution process and a solution principle of the mathematical problem, and thereby having the effect of allowing a user to easily perform a logical approach to various mathematical problems.

In addition, the present invention provides a teaching aid of a mathematical computation that implements a method of performing computations on various mathematical problems including a sequence-related problem using a sequence board and a plurality of objects (cubes, blocks, etc.), thereby effective for anyone to easily learn a solution process and a solving principle of the mathematical problem.

Moreover, the present invention has the effect of intuitively recognizing and understanding the solving process and the solution principle of a mathematical problem, by arranging or rearranging a plurality of objects on the sequence board, which allows numbers and mathematical computations to be visually expressed.

BRIEF DESCRIPTION OF THE DRAWINGS

For more complete understanding of this disclosure, reference is now made to the following brief description, taken in connection with the accompanying drawings and detailed description.

FIG. 10 is a flowchart illustrating a procedure for computing mathematics using engraving objects according to an embodiment of the present invention.

DETAILED DESCRIPTION

Figure 1:
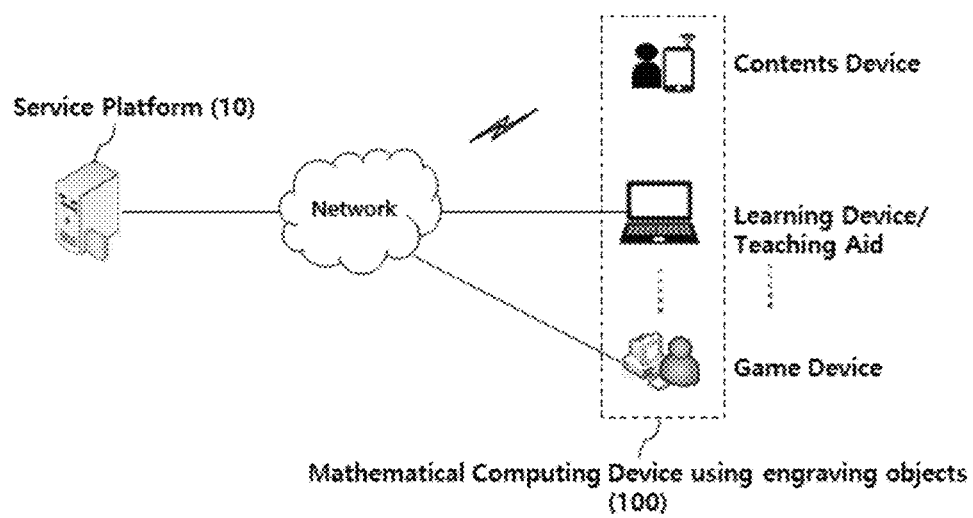
FIG. 1 is a diagram illustrating an example in accordance with an embodiment of the present invention, in which a variety of devices for computing mathematics utilizing engraving objects and a service platform for providing services to the device are connected to a communication network to provide services.

Hereinafter, preferred embodiments of the present invention will be described in detail with reference to the accompanying drawings. Like reference symbols in the drawings denote like elements. Also, specific structural and functional descriptions for embodiments of the present invention are presented for purposes of describing embodiments of the present invention only, and unless otherwise defined, all terms used herein, including technical or scientific terms have the same meaning as commonly understood by those of ordinary skill in the art to which the present invention belongs.

FIG. 1 is a diagram illustrating an example in which a variety of devices for computing mathematics utilizing engraving objects and a service platform for providing services to the device are connected to a communication network to provide services in accordance with an embodiment of the present invention.

As shown in FIG. 1, the mathematical computing device 100 using engraving objects according to an exemplary embodiment of the present invention may be provided in various devices to a user as various tools including a content device, a learning aid, a game device, and the like. Of course, the mathematical computing device 100 is installed in the form of an application program in a general-purpose computer or a user terminal, and by doing so, the general-purpose computer or the user terminal becomes a mathematical computing device utilizing the engraving objects (cubes, blocks, etc.).

Figure 2:
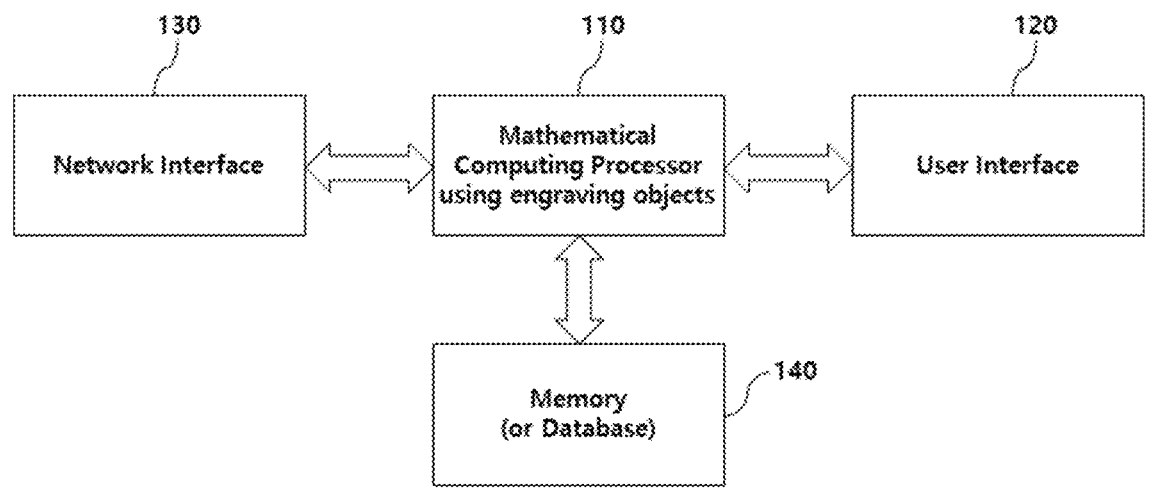
FIG. 2 is a block diagram illustrating a configuration of a mathematical computing device using engraving objects in accordance with an embodiment of the present invention.

On the other hand, the embossing and engraving mentioned below are opposite to each other, and as illustrated in FIG. 2, the engraving object means a shape that is inwardly caved in the plane (i.e., concave shape), and the embossing object means a shape protruding outward from the plane (i.e., a convex shape). The engraving and embossing cubes are described in detail with reference to FIG. 5.

The service platform 10 interconnects a user and a service provider (not shown) and can provide a variety of services (e.g., a mathematics education program) to the user by a service provider, wherein the services are based on mathematical computing methods that utilize the engraving objects (cubes, blocks, etc.).

That is, the service platform 10 provides an application program interface (API) through a wired/wireless communication network, and the service provider can develop various services with the API by utilizing the mathematical computing methods using the engraving cubes according to the present invention. For example, it is possible to develop an application (APP) based on a mathematical computing method using the above-mentioned engraving cubes, to provide it as an instructional program of a teacher who teaches mathematics, or to develop a mathematical learning application and provide it to a learner who wants to study mathematics.

Also, a user such as a teacher or a learner can download and use various applications provided by the service provider through the service platform 10 or an application store (not shown), and the device that can use the application may be a smart phone, a PC, a notebook PC, a tablet PC, a dedicated learning device, or a memory (e.g., USB, SSD, etc.), and thus the user can execute the mathematical computing program utilizing the engraving cubes through the application by executing the application downloaded to the device.

In addition, the mathematical computing method of the present invention can represent numerical values using the engraving objects (blocks, cubes, etc.) and sensuously shows the mathematical computing process, and can be implemented as an independent application or program by itself. Therefore, it can be independently provided in the service platform 10 or the mathematical computing device 100.

Accordingly, a user accesses the service platform 10 through a wired/wireless network using a user terminal to request a mathematical computing process for a specific mathematical problem, and can be provided with the results in real time or as contents for the computing process of the mathematical problem, and the computing process for the mathematical problem may be provided as an application program in the user terminal itself.

In addition, the service platform 10 provides an operating environment for various kinds of devices provided by the user, and performs various roles such as automatic updating of applications provided by the service provider.

In addition, the mathematical computing method of the present invention can be not only implemented as an application or a program in online, but implemented to be used on offline by being manufactured as a mathematical learning device comprising a book (e.g., a picture book), a play tool (e.g., a block play tool), a block, a game device, an experiencing apparatus, a learning apparatus, or the combinations thereof using arbituary material including paper, wood, plastic, metal or the combinations thereof. Therefore, the term, device in the present invention may be various types of products manufactured using various materials.

That is, the mathematical computing method according to the present invention can be produced as a book, a play apparatus, a teaching aid, an experiencing apparatus, etc., in which a number can be expressed using engraving and embossing cubes and a mathematical computation can be expressed intuitively, and moreover It can also be provided as a video (moving pictures) of a mathematical computation through a book, a playing apparatus, a teaching aid, and an experiencing apparatus. The video includes a plane image, a stereoscopic image, and the like, and such a video may be reproduced in the form of an animation.

Hereinafter, the structure of a device for providing various kinds of contents to various kinds of devices using a mathematical computing method will be described in detail.

FIG. 2 is a block diagram illustrating a configuration of a mathematical computing device using engraving objects (cubes, blocks, etc.) in accordance with an embodiment of the present invention.

As shown in FIG. 2, the mathematical computing device 100 may comprise a mathematical computing processor 110 that uses the engraving cubes to compute a mathematical problem inputted through the network or directly from a user, a user interface 120 for receiving a mathematical problem from a user or outputting a mathematical computing process, a network interface 130 for connecting the mathematical computing device 110 to a wired/wireless network, and memory 140.

In addition, the mathematical computing processor 110 loads and executes an application or a program that implements a mathematical computing method stored in the memory 140 from the memory 140.

The mathematical computing processor 110 recognizes input mathematical problems and expresses numbers and mathematical expressions included in the mathematical problems by using engraving objects (blocks, cubes, etc.), embossing objects, or the combinations thereof.

In addition, the mathematical computing processor 110 performs the computation on mathematical expressions or mathematical problems by using the engraving and embossing cubes, and outputs the computing process and result to an output device such as a display through an output interface (not shown) so that the user can intuitively recognize the computing process and result.

The mathematical computing processor 110 may generate and output a multimedia contents for a process or a computation of a specific mathematical problem in outputting the computing process and result for the specific mathematical problem. The multimedia contents may include text, video (e.g., images), graphics, characters, sounds (e.g., voice, music, etc.), animation or the combinations thereof, allows the user to easily understand the solution principle and solution process for the mathematical problem.

In addition, the user interface 120 serves as an interface for receiving a mathematical problem from a user, providing an expression, a computing process, and a computing result using the engraving objects through a display.

Now, a user can input information on a specific mathematical problem using a voice, a touch pad, a keyboard, or the like, and the mathematical computing processor 110 outputs the result of the mathematical problem inputted by the user to an output device such as a display through the user interface 120. In addition, the output can also be produced as an audible or tactile signal as well as text, video (image, etc.), graphic, character, sound (e.g. voice, music, etc.) or the combinations thereof. Therefore, such an input method and an output method are not limited to those listed above in the present invention. That is, there is no limitation on the input method and means, the output method, and the means.

In addition, the network interface 130 may allow the mathematical computing device 100 to connect to a wired/wireless network so as to receive a service remotely through the service platform 10, or it is possible to provide means for enabling mutual communication between the mathematical computing devices 100 by utilizing the plurality of engraving cubes. In this way, the mathematical computing device 100 can interconnect a plurality of users and can provide a means for exchanging opinions on specific mathematical problems.

The network interface 130 is also connected to the service platform 10 so as to enable a user to utilize various services provided by the service provider through the service platform 10.

In addition, the memory 140 may store information about the engraving cubes and embossing cubes necessary for operating the mathematical computing processor 110, acoustic information, graphic information, information about the program about the process of computing mathematics by using engraving cubes, and information about the recognized mathematical problems. The memory 140 may be a hard disk drive (HDD), a solid-state drive (SSD), a random-access memory (RAM), or a database.

Figure 3:
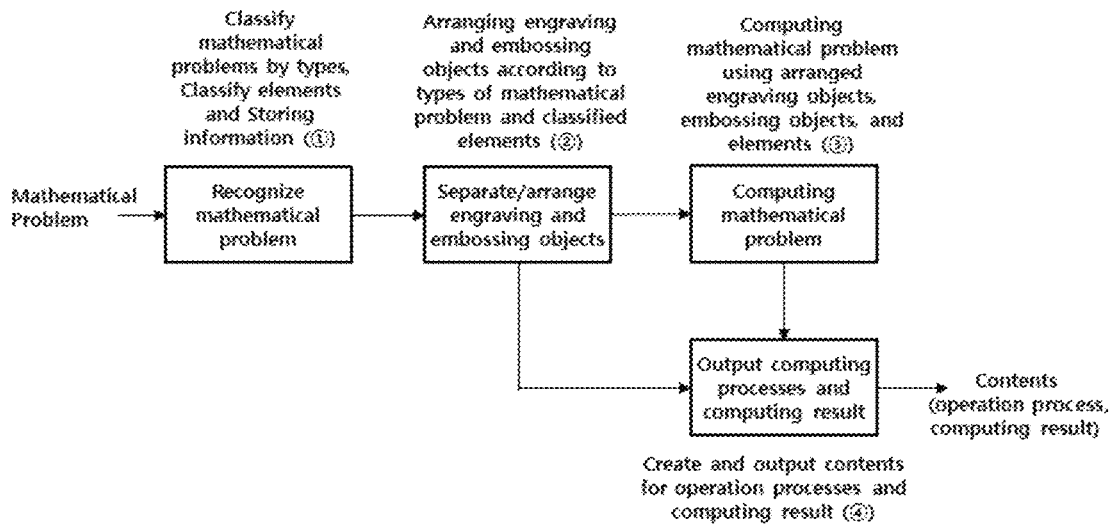
FIG. 3 is a block diagram illustrating operations of a mathematical computing processor in a mathematical computing device according to an embodiment of the present invention.

FIG. 3 is a block diagram illustrating operations of a mathematical computing processor in a mathematical computing device according to an embodiment of the present invention.

As shown in FIG. 3, the processing procedure of the mathematical computing processor 110 recognizes a mathematical problem inputted through the user interface 120 or the network interface 130 (①).

The recognition is performed by classifying the inputted mathematical problems into variable types (e.g., arithmetic computation, sequences, equations, inequalities, multiplicative equations, etc.) and separately catorizing and storing elements of the classified mathematical problems.

The classification may be performed according to a classification rule that allows classification of a specific mathematical problem by predefining characteristics of each type of mathematical problem.

The element includes a variable, a constant, an operator, and the like included in the classified mathematical problem.

Next, the mathematical computing processor 110 classifies and arranges the recognized mathematical problem into embossing cubes, engraving cubes, or the combinations thereof of the mathematical problems according to types and classification elements (②).

For example, if the input mathematical problem is a linear (first order) equation, the embossing cubes and the engraving cubes may be listed according to the variable or the magnitude of the constant for the equation, will be arranged one-dimensionally on a straight line according to the operators (addition or subtraction) of the equation. If the input mathematical problem is a quadratic (second order) equations, embossing cubes, engraving cubes or the combinations thereof will be two-dimensionally arranged according to the variables, constants and operators of the quadratic equation.

Next, the mathematical computing processor 110 computes the corresponding mathematical problem using the above-described classified and arranged engraving cubes, embossing cubes, or the combinations thereof (③).

The computing process may be performed by rearranging the classified and arranged engraving cubes, embossing cubes or the combinations thereof, or adding new engraving cubes, embossing cubes or the combinations thereof, or partially removing the existing engraving cubes, embossing cubes, or the combinations thereof.

Such a series of processes can be performed according to a computational rule which is pre-stored for each type of a mathematical problem.

Next, the mathematical computing device 110 provides the user with outputting the computing process and the computing result for the mathematical problem through the user interface 120 (④).

Further, the mathematical computing device 110 generates a multimedia contents of a process or result of computing the mathematical problem including a graphic, a video, an animation, a voice, a text or the combinations thereof, and the multimedia contents can be provided to the user through the user interface 120.

Figure 4:
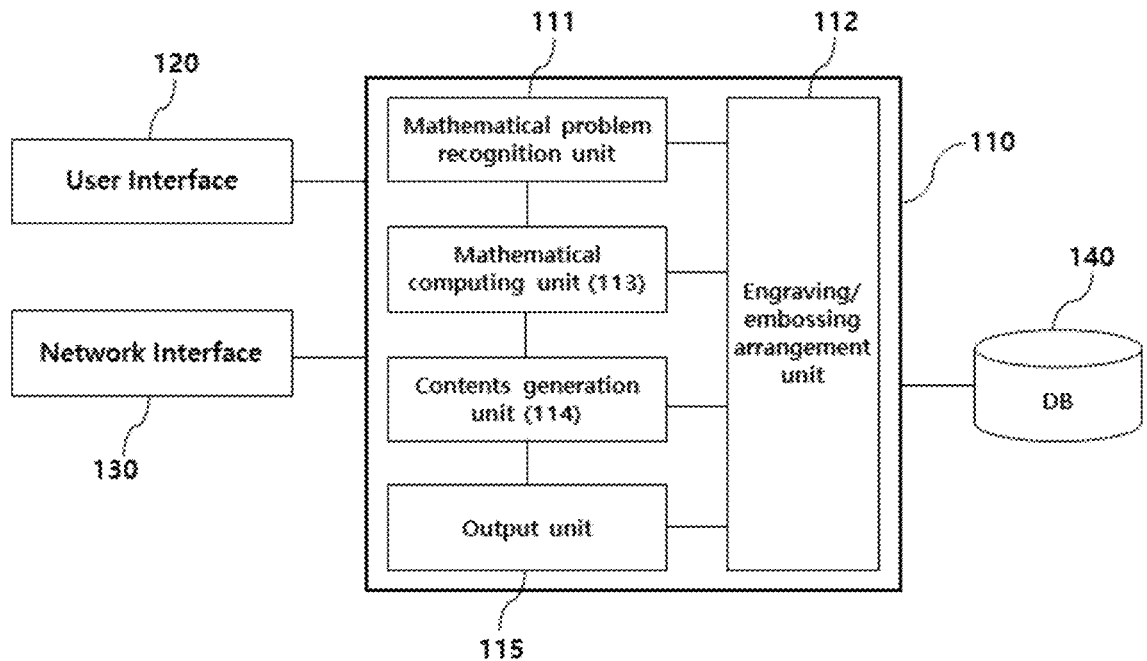
FIG. 4 is a block diagram illustrating a detailed configuration of a mathematical computing processor in a mathematical computing device using engraving objects according to an embodiment of the present invention.

FIG. 4 is a block diagram illustrating a detailed configuration of a mathematical computing processor in a mathematical computing device using engraving objects according to an embodiment of the present invention.

As illustrated in FIG. 4, the mathematical computing processor 110, which expresses numbers using the engraving objects and provides associated computing process for a mathematical problem, comprises a mathematical problem recognition unit 111 for recognizing a mathematical expression or mathematical problem inputted from a user, an engraving/embossing arrangement unit 112 for arranging or rearranging embossing objects and engraving objects according to the recognized mathematical problem, a mathematical computing unit 113 for computing the recognized mathematical problem, and a contents generation unit 114 for generating a multimedia contents anout the process or result of computing the mathematical problem, and an output unit 114 for outputting the generated multimedia contents.

Herein, the mathematical problem recognition unit 111 recognizes a mathematical problem inputted from a user through a user interface 130. And the mathematical problem recognition unit 111 may recognize a mathematical problem directly inputted from a user through the user interface 130 or recognize a mathematical problem inputted through a network interface 120.

In addition, the mathematical problem recognition unit 111 classifies the inputted mathematical problems by types, identifies corresponding mathematical problems by classifying elements including variables, constants, and operators of the corresponding mathematical problems. Since the process of recognizing the mathematical problem has been described with reference to FIG. 3, a detailed description of the the mathematical problem recognition unit 111 will be skipped here.

The engraving/embossing arrangement unit 112 expresses numbers and mathematical expressions using engraving objects, embossing objects, or the combinations thereof based on the recognized mathematical problem, and allows the output unit 115 to output to various output devices such as a display.

The mathematical computing unit 113 performs mathematical operational processes of the recognized mathematical problem. The mathematical computing unit 113 may arrange or rearrange the arrayed embossing and engraving objects according to the computational processes of the corresponding mathematical problem in cooperation with the engraving/embossing arrangement unit 112, and then allows the corresponding computing processes to be outputted through the output unit 115.

The contents generation unit 114 generates a multimedia contents for the computing process and the computing result of the recognized mathematical problem, and stores the generated multimedia contents in a database (or memory) 140, and the output unit 115 outputs the generated multimedia contents to a user through the user interface 120.

That is, the mathematical computing processor 110 visualizes the arrangement or rearrangement processes of the engraving objects and embossing objects and the computing result according to computational process for the mathematical problem inputted from a user or a network through the engraving/embossing arrangement unit 112, the mathematical computing unit 113, a contents generation unit 114, and an output unit 115, thereby allowing users to intuitively recognize the solving principle and solution process for the mathematical problem.

Hereinafter, the concept of engraving and embossing and the processes of arranging the engraving objects and embossing objects for the inputted mathematical problem and then computing the corresponding mathematical problem will be described in detail with reference to the following figures.

Figure 5:
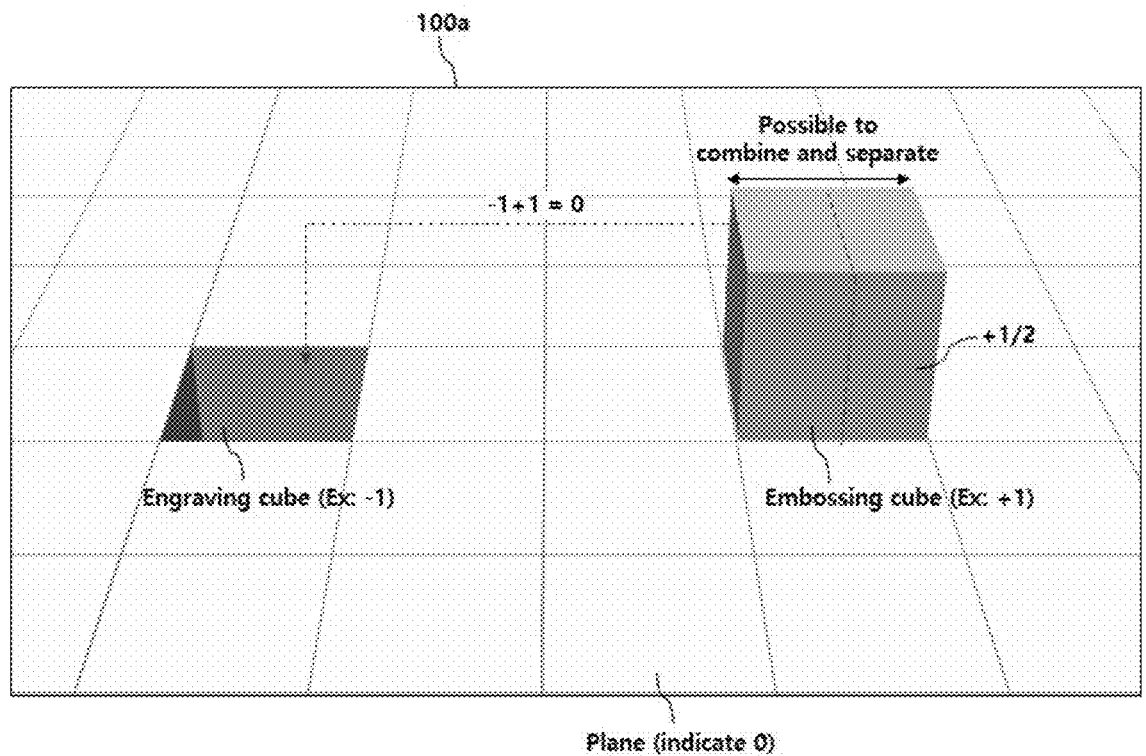
FIG. 5 is a diagram for explaining the concept of embossing objects and engraving objects according to an embodiment of the present invention.

FIG. 5 is a diagram for explaining the concept of embossing objects and engraving objects according to an embodiment of the present invention.

As shown in FIG. 5, the engraving is expressed in the form of a concave three-dimensional figure depressed inward from the plane, and the embossing objects are located on the upper part of the plane and thus expressed in the form of a convex three-dimensional figure.

In addition, the engraving and embossing objects are with the same sizes as shown to correspond to each other. That is, one engraving object and one embossing object represent the same size (meaning the size with respect to the absolute value) of a number.

In addition, the engraving object represents a negative number, and the embossing object represents a positive number. For example, if one engraving object represents the number, −1, the corresponding one embossing object represents the number, +1. On the other hand, the plane represents the area, that is, 0, where there is no engraving and embossing (or where the embossing object and engraving object are canceled from each other).

FIG. 5 shows that −1+1=0 by explaining −1 with an engraving object and +1 with an embossing object. In other words, 1 means that 1 is added to the plane, and −1 means that an embossing object is subtracted from the plane.

On the other hand, the size of a number represented by a single engraving object may vary depending on the setting of a user and a service provider, and accordingly, the size of a number representing the embossing object and the plane can be varied. However, it is preferable that one engraving object represents −1 which is a negative integer.

Although the shapes of engraving and embossing objects illustrated in FIG. 5 are shown as shapes of a cube, of course it is also possible to set various three-dimensional shapes such as cylinders, hexagonal columns, and cones according to the setting of a user and a service provider.

Figure 6:
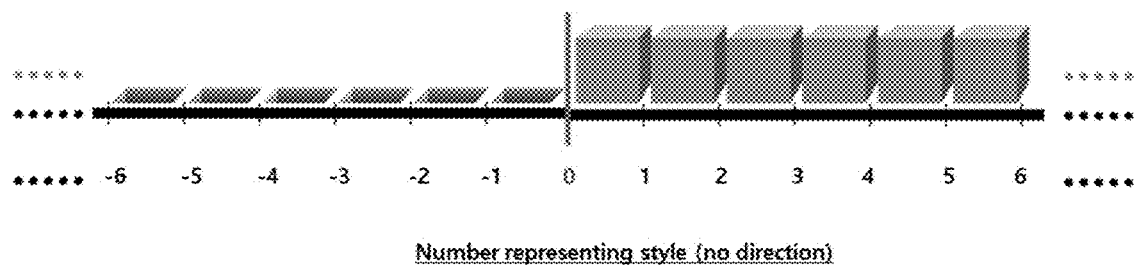
FIG. 6 is a diagram for explaining a method of representing a number using embossing objects and engraving objects according to an embodiment of the present invention.

FIG. 6 is a diagram for explaining a method of representing a number using embossing objects and engraving objects according to an embodiment of the present invention.

As illustrated in FIG. 6, a method of representing a number on a vertical line (that is, a number line) can be simply expressed by arranging at least one engraving object and at least one embossing object or the combinations thereof.

The conventional technique of expressing a number using cubes fails to introduce the concept of engraving and embossing objects, so the concept of direction must be applied in order to simultaneously explain a negative number and a positive number. For example, when explaining −4 only with a vertical line, a direction should be presented like the cube located at the right side of the reference point (eg, a position with a value of 0) and then −4 can be distinguished from +4. This is because the lengths on the vertical lines of −4 and +4 from the reference point are the same.

However, the present invention provides a framework for sensuously understanding what a negative number means on an actual vertical line by arranging engraving objects in the meaning of a vertical line to represent a number. In other words, the engraving object is a negative number in itself, so there is no need to apply the concept of directionality. By arranging a plurality of engraving objects on a vertical line, the size of a negative number can be intuitively recognized.

For example, if four engraving objects are arranged in a row, it means the number −4, and conversely, when four embossing objects are arranged in a row, it means the number +4.

As described above, the mathematical computing device 100 expresses numbers using the engraving objects, embossing objects or the combinations thereof, so that it is easy to visually recognize the distinction as to whether the corresponding number is a negative number or a positive number.

Figure 7A:
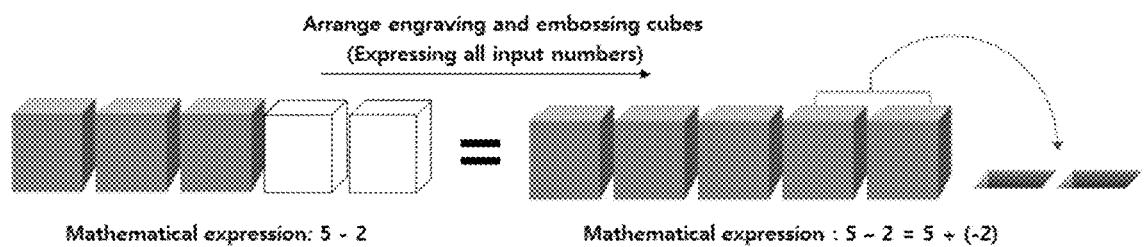
FIG. 7A to FIG. 7C illustrate a process of expressing mathematical expressions and computing mathematics through arrangement and rearrangement of embossing and engraving objects according to an embodiment of the present invention.
Figure 7B:
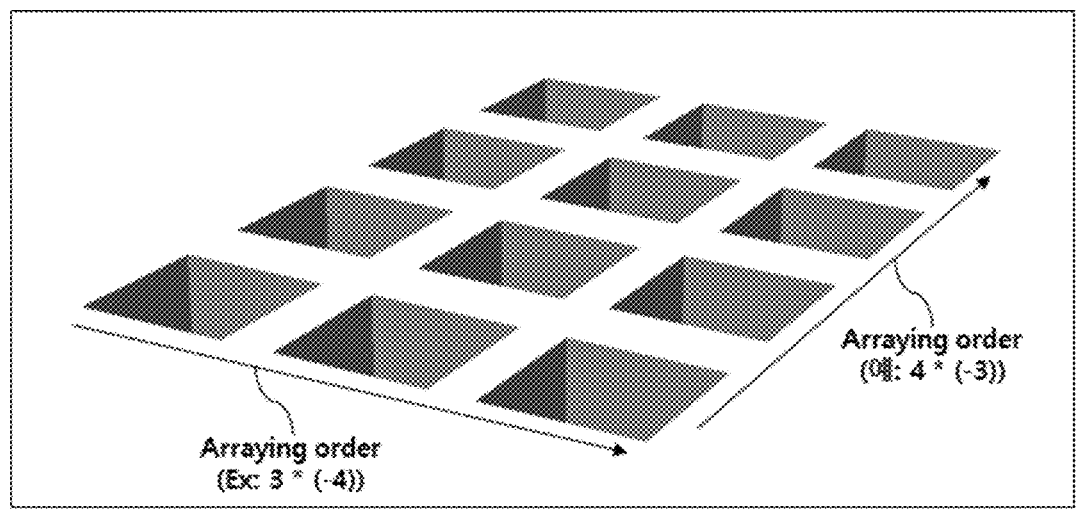
Figure 7C:
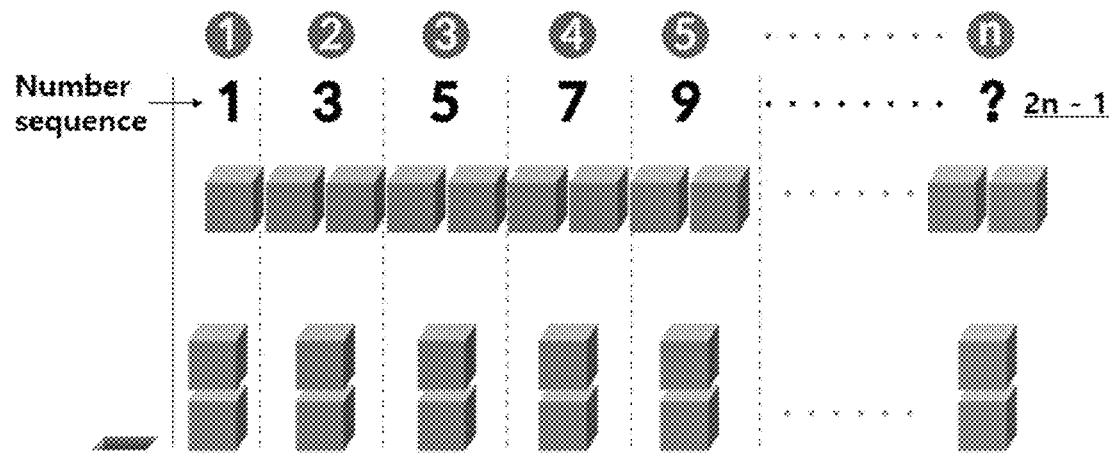

FIG. 7A to FIG. 7C illustrate a process of expressing mathematical expressions and computing mathematics through arrangement and rearrangement of embossing objects and engraving objects according to an embodiment of the present invention.

FIG. 7A is a diagram illustrating a process of expressing numbers and mathematical expressions through arrangement and rearrangement of embossing objects and engraving objects, and computing mathematics with equation of (5−2) as an embodiment.

As illustrated in FIG. 7A, when recognizing the mathematical expression inputted through the user interface 120 or the network interface 130, the mathematical computing device 100 using the engraving objects arranges the engraving and embossing objects, and expresses a mathematical expression and the numbers included in the mathematical expression.

For example, when the equation of (5−2) is inputted through the user interface 120 or the network interface 130, because it is a one-dimensional computation, the mathematical computing device 100 using the engraving objects represents both the numbers 5 and −2 of the mathematical expressions that are entered the engraving and embossing objects in a row.

It can be intuitively recognized that the corresponding equation is 5−2 by expressing only the number 5 and the number −2.

In the conventional technique using a cube, when the equation (5−2) is inputted, 5 cubes are used to represent 5, when −2 is inputted next, 2 cubes are deleted from 5 cubes to leave only 3 cubes, and thus the corresponding equation was computed.

While the equation (5−2) as computing results in 3 by subtracting 2 from 5, it can be seen that the result of the corresponding equation by using the engraving objects of the present invention is the same as that of the equation (5+(−2)). It is very meaningful to express (−2) as above. That is, by explicitly indicating the number of 5 and the number of 2 which is subtracted, it has the effect of simultaneously displaying two numbers.

In general, when using the expression (x+5), since x in the equation can be both positive number and negative number, it is often necessary to express x explicitly. Accordingly, the method of computing mathematics using the engraving objects in accordance with the present invention can be used very particularly in case of factorization, multiplication formula, or general algebra where an unknown value should be considered.

In addition, in the process of calculating the equation (5−2), the mathematical computing device 100 using the engraving objects expresses the process of forming planes by inserting 2 embossing objects of 5 embossing objects representing 5 into two engraving objects representing −2 (see the arrow illustrated in FIG. 7A), outputs this process and thus enables a user intuitively to perceive the computing process.

That is, the mathematical computing device 100 visualizes the movements of the embossing or engraving objects and provides it to a user, and thus visually recognizing the computing process for the mathematical expression.

FIG. 7B is a diagram illustrating a process of expressing numbers and mathematical expressions for the equation 4*(−3) as an exampliarily embodiment through arrangement and rearrangement of the engraving objects and embossing objects, and computing mathematics.

As shown in FIG. 7B, when the mathematical expression 4*(−3) (the original meaning is that there are four −3, or −3 is added 4 times) is inputted through the user interface 120 or the network interface 130, the mathematical computing device 100 using the engraving objects arranges engraving objects and embossing objects and provides the computing process for the mathematical expression to a user.

That is, the mathematical computing device 100 expresses (−3) by using three engraving cubes and repeats the expression four times, so that the computing process for the corresponding equation 4*(−3) to a user. Consequently, the result is the same as the result of attaching (1) after computing 4*3. This visually indicates that multiplication a positive number by a negative number becomes a negative number.

As also expressing the process of arranging the engraving cubes, embossing cubes, or the combinations thereof on a two-dimensional plane according to an operator, *(multiplication operator), it can be intuitively recognized that the corresponding mathematical expression is 4*(−3).

Since the equation (−4)*3 means that subtracting 3 should be performed four times, subtracting 3 at a time generates engraving cubes of −3, and since the subtraction is repeated 4 times, −3 occurs 4 times, and thus as a result, it can be understood that the result is the same as the equation of 4*(−3) as described above. This is again the same as −(4*3).

The computation of x*y can be genaralized to the meaning of adding (for + value) or subtracting (for 1 value) y by x times. Therefore, in the above embodiment, '4*(−3)=(−4)*3' means 'add −3 by four times'='subtract 3 times by four times'.

FIG. 7C is a diagram illustrating a process of expressing numbers and mathematical expressions through arrangement and rearrangement of the engraving objects and embossing objects, and computing mathematics using a sequence as an embodiment.

As illustrated in FIG. 7C, when a sequence is inputted through the user interface 120 or the network interface 130, the mathematical computing device 100 arranges engraving cubes and embossing cubes to provide a computing process for the corresponding sequence to a user.

Hereinafter, the case where the input sequence is 1, 3, 5, 7, 9, . . . will be explained as an example.

The engraving/embossing arrangement unit 110 provided in the mathematical computing processor 100 performs arrangement, rearrangement, or the combinations thereof for the engraving cubes or embossing cubes corresponding to the above listed number with respect to arbitrary listed numbers of the inputted sequence, the sum of following number with the previous number are arranged in the horizontal direction, and then this process is repeated so that the pattern of the corresponding sequence can be grasped.

Next, the mathematical computing processor 110 rearranges the embossing cubes or engraving cubes arranged in a horizontal direction to the vertical direction to determine the increase or decrease in the numbers of the corresponding sequence.

In this case, since the sequence is incremented by 2, all of the elements in the sequence are arranged with embossing cubes, and the increasing pattern of the sequence is 2*n, but this pattern has the first number of 2 for the embossing cubes, which is one bigger than the initial setting value of 1 (e.g., the first number in the sequence before arrangement). Accordingly, the mathematical computing processor 110 can arrange the sequence by adding one engraving cube, and then compute the n-th value of the sequence to have a value of 2*n−1.

In addition, the mathematical computing processor 110 provides a user with a process of arranging or rearranging the embossing cubes or engraving cubes in order to find the regularity of the increase/decrease pattern on the input sequence, and thus enables a user to intuitively recognize the solution process and solution principle of the corresponding sequence.

Figure 8A:
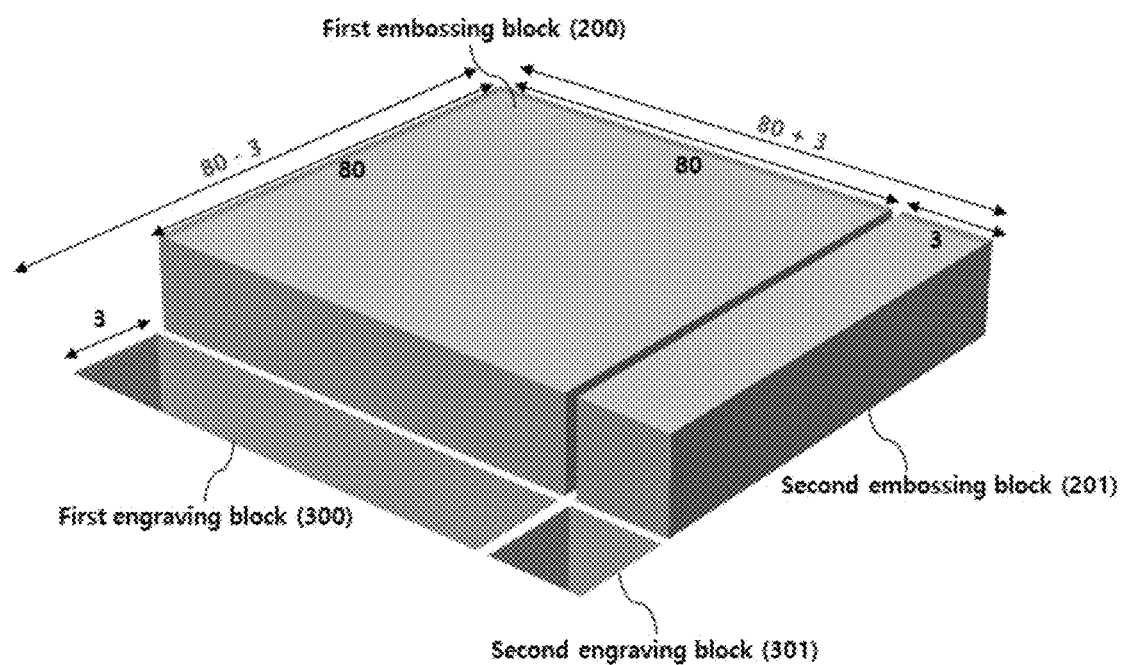
FIG. 8A and FIG. 8B illustrate a process of expressing numbers and mathematical expressions through arrangement and rearrangement of embossing and engraving objects, and computing mathematics using a multiplication formula as an embodiment.
Figure 8B:
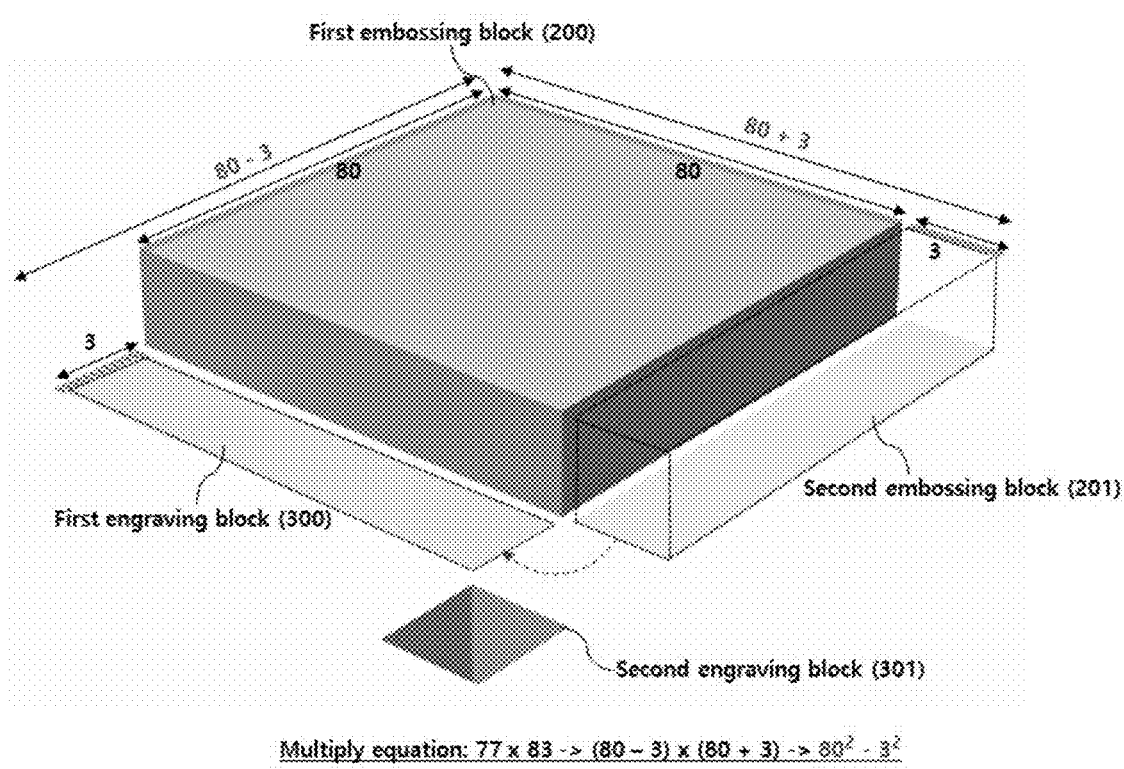

FIG. 8A and FIG. 8B illustrate a process of expressing numbers and mathematical expressions through arrangement and rearrangement of embossing and engraving objects, and computing mathematics using a multiplication formula as an embodiment.

As illustrated in FIG. 8A and FIG. 8B, when the multiplication (77*83) is inputted through the user interface 120 or the network interface 130, the mathematical computing device 100 arranges the engraving cubes and embossing cubes to provide the computing process for the corresponding multiplication to a user.

In addition, the mathematical computing processor 110 recognizes the inputted multiplication (77*83), and can change the multiplication so that it can be represented as a square having the same side length in order to induce a square multiplication. Now, the rule for changing the multiplication to the square multiplication is that one of multiplicand and multiplier must be increased or decreased based on a specific number of the multiplication to make the multiplicand and multiplier have the same number.

For example, 77 and 83 can be the same number by increasing or decreasing by the same number 3 based on the reference number 80. That is, the number 80 is the same number as 77 increased by 3 and 83 decreased by 3.

In addition, the mathematical computing processor 110 arranges blocks using a plurality of embossing cubes or engraving cubes.

Herein, it can be said that 83=80+3. While 77=80−3, it can also be represented as 77=80+(−3) as shown in FIG. 7a. As a result, 77*83 is represented by (80+(−3))*(80+3), so it consists of 4 blocks in total. That is, this equation can be represented with two embossing blocks and two engraving blocks, as shown in the description of FIG. 7B, it is because a positive number block*a negative number block can be represented by a negative number block, and a positive number block and a positive number block can be represented by a positive number block. The first embossing block 200 is generated from 80*80, and the second embossing block 201 is generated from 80*3 and arranged on the right side of the first embossing block. The first engraving block 300 is generated from (−3)*80 and is located at the bottom of the first embossing block. The size is the same as that of the second embossing block 80*3, but it can be understood that it is represented by engraving block. The second embossing block 201 and the first engraving block 300 are faced at an angle of 90 degrees with reference to the lower right corner of the first embossing block 200. Finally, the second engraving block 301 is generated from (−3)*3 and arranges it in vacancy of the lower left corner of the first embossing block.

As shown in FIG. 8B, when the embossing and engraving blocks for the corresponding multiplication is arranged, the size of the second embossing block 201 is equal to that of the first engraving block 300.

Accordingly, the mathematical computing processor 110 moves the second embossing block 201 and inserts the second embossing block 201 into the first engraving block 300, and they are canceled to be a plane. The final computing result is provided by using the remaining first embossing block 200 and second engraving block 301.

The mathematical computing processor 110 can visually show a user the arrangement process and the rearrangement process of the embossing blocks and embossing blocks as described in FIG. 6 to FIG. 7C, so that the user can easily understand the solution principle and solution process for the multiplication.

The quadratic equation (second order equation) can also be derived as a simple square expression so as to be useful for solving the quadratic equation through the computing process described with reference to FIG. 8A and FIG. 8B.

For example, in the case of a quadratic equation x*(x+2)=15, the mathematical computing processor 110 can use the engraving and embossing cubes to arrange an embossing square block having a length x of one side and an embossing rectangular block having a size of 2*x on the right side of the embossing square block.

The mathematical computing processor 110 divides the rectangular embossing block into halves (i.e., divide by 1*x) into two embossing blocks, and one of which is placed on the lower side of the square embossing block. Wherein, 1*1 size of square at the lower right corner falls short, and thus the mathematical computing processor 110 arranges the 1*1 size of embossing block.

In this case, a square having a length x of one side becomes a square having a length of x+1, and thus a square of (x+1) is made. As a result, the quadratic equation x*(x+2)=15 is derived as (x+1)^2=16, and the length of one side of the square, namely (x+1), that is (x+1) can have a value of +4 or −4, so that the solution of x becomes 3 or −5.

FIG. 9A to FIG. 9D are diagrams for explaining a mathematical computing procedure for solving a quadratic inequality using engraving cubes.

As shown in FIG. 9A to FIG. 9D, when the quadratic inequality is inputted through the user interface 120 or the network interface 130, the mathematical computing processor 110 recognizes the inputted quadratic inequality, arranges the engraving cubes and embossing cubes or the combinations thereof, and then expresses the equation of the corresponding quadratic inequality (As a result, it can be seen that the arrangement of embossing and embossing cubes can be arranged in two-dimensional because it is a second order computation).

For example, when the inputted second order inequality is (x−10)*(x−20), whether the actual number of the equation is big or small can be visually confirmed by using the engraving blocks.

That is, it can be easily seen that when the embossing block is expressed more than the engraving block, it has a plus sign (meaning that it is larger than 0) and when the engraving block is expressed more than the embossing block, it has a minus sign (meaning that it is smaller than 0). The mathematical computing processor 110 permits the x value to be replaced with an arbitrary number, sequentially displaying changes of the corresponding engraving blocks and embossing blocks, visually confirming the differences according to the changes, and thereby allowing a user to recognize if the result will be zero, embossing blocks are more than engraving blocks, or engraving blocks are more than embossing blocks.

Figure 9A:
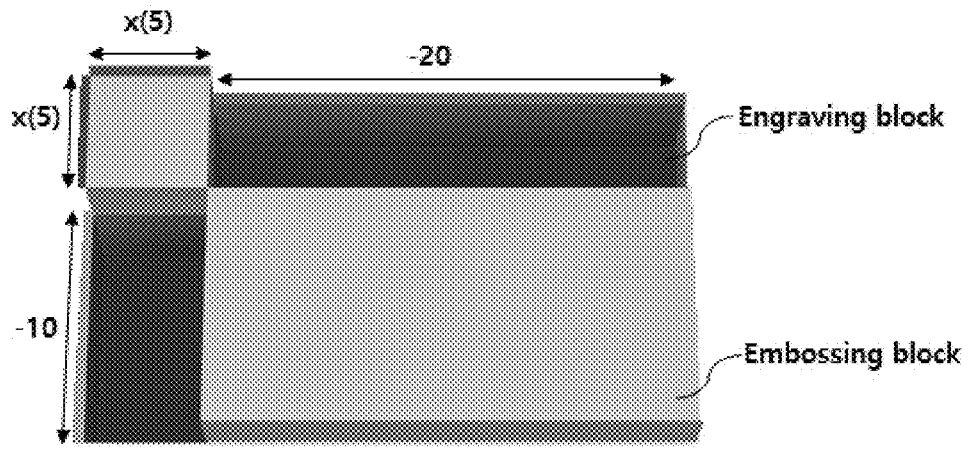
FIG. 9A to FIG. 9D are diagrams for explaining a mathematical computing procedure for solving a quadratic inequality using engraving cubes.

FIG. 9A shows the case where the value of x is less than 10 (for example: x=2) in the quadratic inequality (x−10)*(x−20). Wherein since the range of embossing block is wider than the range of engraving block, the corresponding quadratic inequality is larger than 0.

Figure 9B:
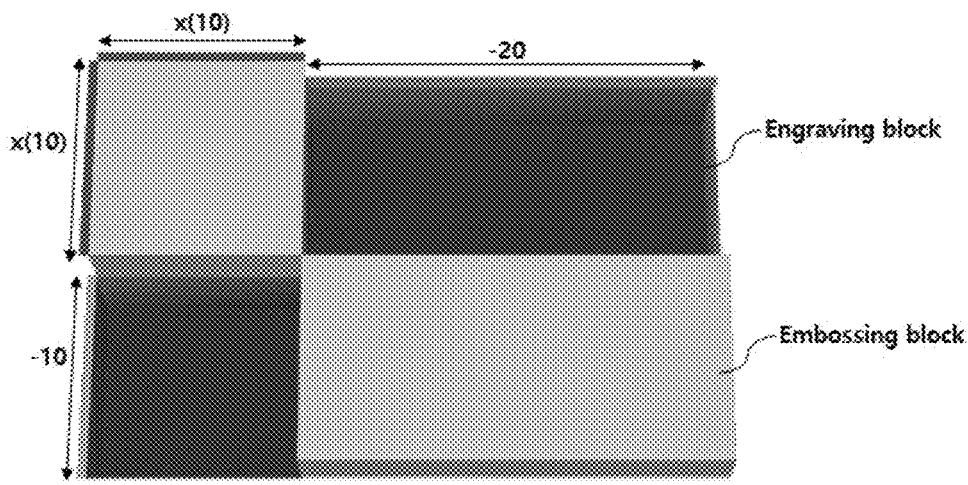

FIG. 9B shows the range of the embossing block and engraving block when the value of x is 10 in the quadratic inequality (x−10)*(x−20). In this case, since the range of the embossing block is the same as the range of the engraving block, it can be seen that the corresponding second order inequality is zero.

Figure 9C:
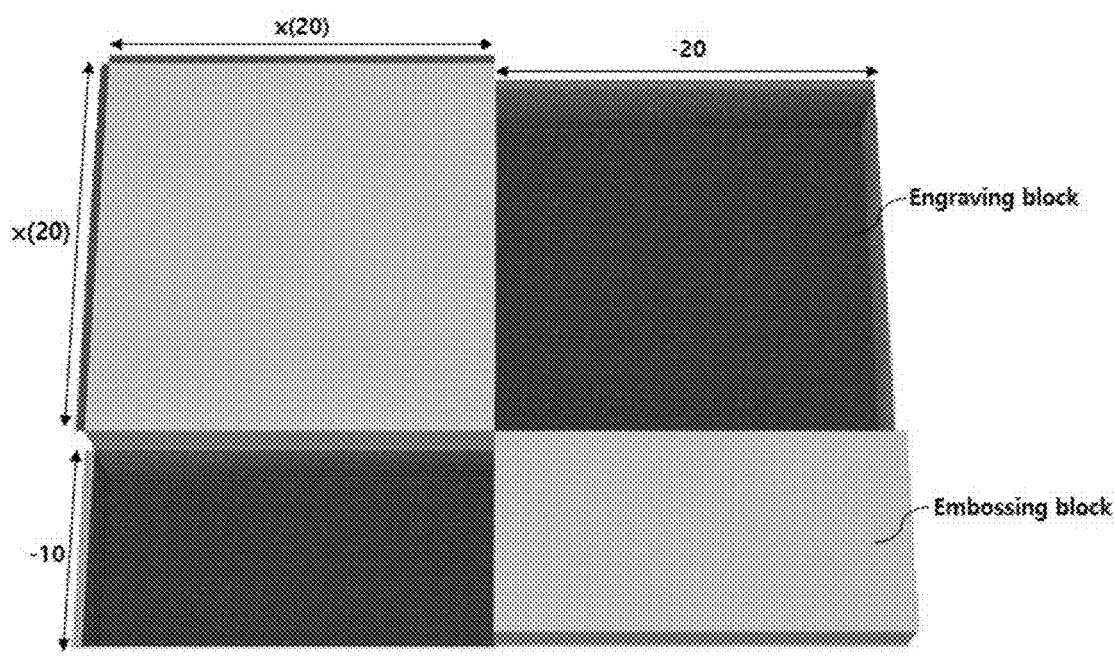

FIG. 9C shows the range of the embossing block and the range of the engraving block when the value of x is 20 in the quadratic inequality (x−10)*(x−20). In this case, since the range of the embossing block is the same as the range of the engraving block, it can be seen that the corresponding second order inequality is zero.

Figure 9D:
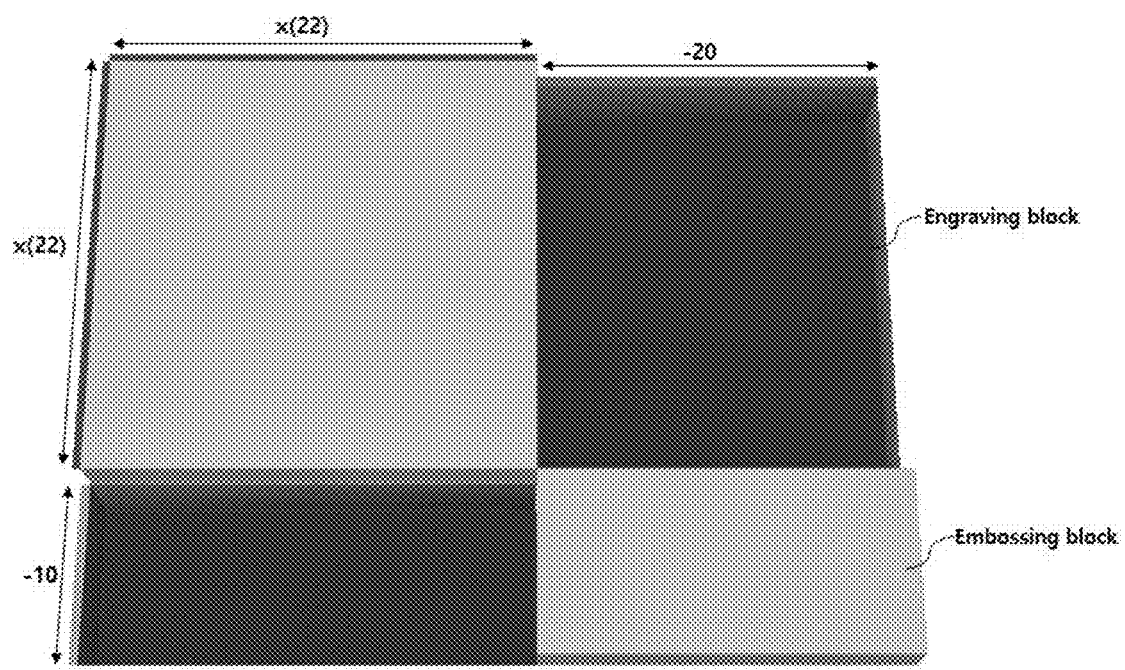

FIG. 9D shows the range of embossing block and the range of engraving block when the value of x in the quadratic inequality (x−10)*(x−20) is greater than 20 (for example: x=22). Since the range of embossing block is larger than the range of engraving block, it can be seen that the corresponding second order inequality is larger than 0.

As a result, if x has a value of 10 or 20 in the quadratic inequality, the sizes of engraving blocks and embossing blocks are the same, thus they can be canceled. If x has a value between 10 and 20 in the quadratic inequality, the range of engraving blocks is larger than that of embossing blocks, and thus even if the embossing blocks are inserted into the engraving blocks, it is understood that the the engraving blocks remains, and thus it can be seen that the quadratic inequality is less than 0. Accordingly, x of the quadratic inequality can be visually recognized between 10 and 20 (10<x<20).

FIG. 10 is a flowchart illustrating a procedure for computing mathematics using engraving objects according to an embodiment of the present invention.

As shown in FIG. 10, the procedure for computing mathematics is to firstly receive a mathematical problem as input in the mathematical computing processor 110 directly from a user through the user interface 120 or via the network interface 130 (S110), and then the mathematical computing processor 110 recognizes the inputted mathematical problem (S120).

The recognition is performed by classifying the type of the inputted mathematical problem and dividing variable, constant, and operator in the mathematical problem storing them into the memory 140.

That is, the mathematical computing processor 110 can recognize various types of mathematical problems such as a linear equation, a quadratic equation, a cubic equation or higher-order equation, a sequence or an arithmetic expression, etc. It goes without saying that the mathematical problem can be inputted as a specific expression using a touch pad, a keyboard, or the like, or inputted as a voice using a microphone.

Accordingly, the mathematical computing processor 110 can be configured to recognize various types of mathematical problems inputted through a touch pad, a keyboard, a microphone, and the like.

Next, the mathematical computing processor 110 divides the engraving and embossing blocks from the recognized mathematical problem (S130), and arranges the classified engraving blocks, embossing blocks, or the combinations thereof according to the operator of the recognized mathematical problem (S140).

The division is performed by dividing the variables or the constants into a negative or a positive number based on the variables and constants classified in S120, and selecting engraving blocks or embossing blocks corresponding to the variable or constant.

The mathematical computing processor 110 arrays the classified engraving blocks, embossing blocks into one-dimensional, two-dimensional plane, and three-dimensional cubic according to the types of an operator or the mathematical problem classified in S120.

The array is arranged in a plurality of engraving blocks, a plurality of embossing blocks, or the combinations thereof depending on the size of the variable or constant. That is, the mathematical computing processor 110 expresses various ranges of a number (negative number, positive number, fraction, real number, etc.) using the engraving and embossing blocks, so that a user can sensuously recognize the size of the corresponding number.

Next, when the engraving blocks and embossing blocks, or the combination thereof are completed to be arrayed (S150), the mathematical computing processor 110 computes the corresponding mathematical problem using the arrayed engraving blocks and embossing blocks, or the combinations thereof and the classified operator.

The computation is also performed by rearranging the arrayed engraving blocks and embossing blocks based on a rule for type of a specific mathematical problem stored in advance, deleting, or adding some engraving blocks and embossing blocks.

The mathematical computing processor 110 obtains a solution by deriving the optimal mathematical expression from the mathematical problem, generates contents sequentially showing the process deriving the optimal mathematical expression, provides the contents to a user, and thus allows the user to visually easily understand the computing process of the corresponding mathematical problem.

Next, the mathematical computing processor 110 outputs a computing process and a computing result for the mathematical problem (S170).

The mathematical computing processor 110 generates the computing process and the computing result as multimedia contents and provides it to a user, in which the multimedia contents may include a process of arranging or rearranging engraving blocks and embossing blocks, or the combination thereof, a process of changing the overall arrayed engraving blocks and embossing blocks, and a computing result using engraving blocks and embossing blocks, or the combination thereof and operators.

As described above, the present invention relates to a mathematical computing method using an engraving object, a device and a platform for providing the mathematical computing method, expresses a specific mathematical expression visually using the engraving objects, and thus it is possible for a user to perceive the mathematical expression sensuously and immediately. In addition, the present invention can derive optimal mathematical expressions by using engraving objects, computes the mathematical problem by arranging and rearranging the corresponding engraving objects, provides these computing processes to the user, and thus having the effect for a user to be easily and objectively and logically accessible to the mathematical problem.

Hereinafter, a teaching aid for computing mathematics using a sequence board according to the present invention will be described in detail.

Figure 11:
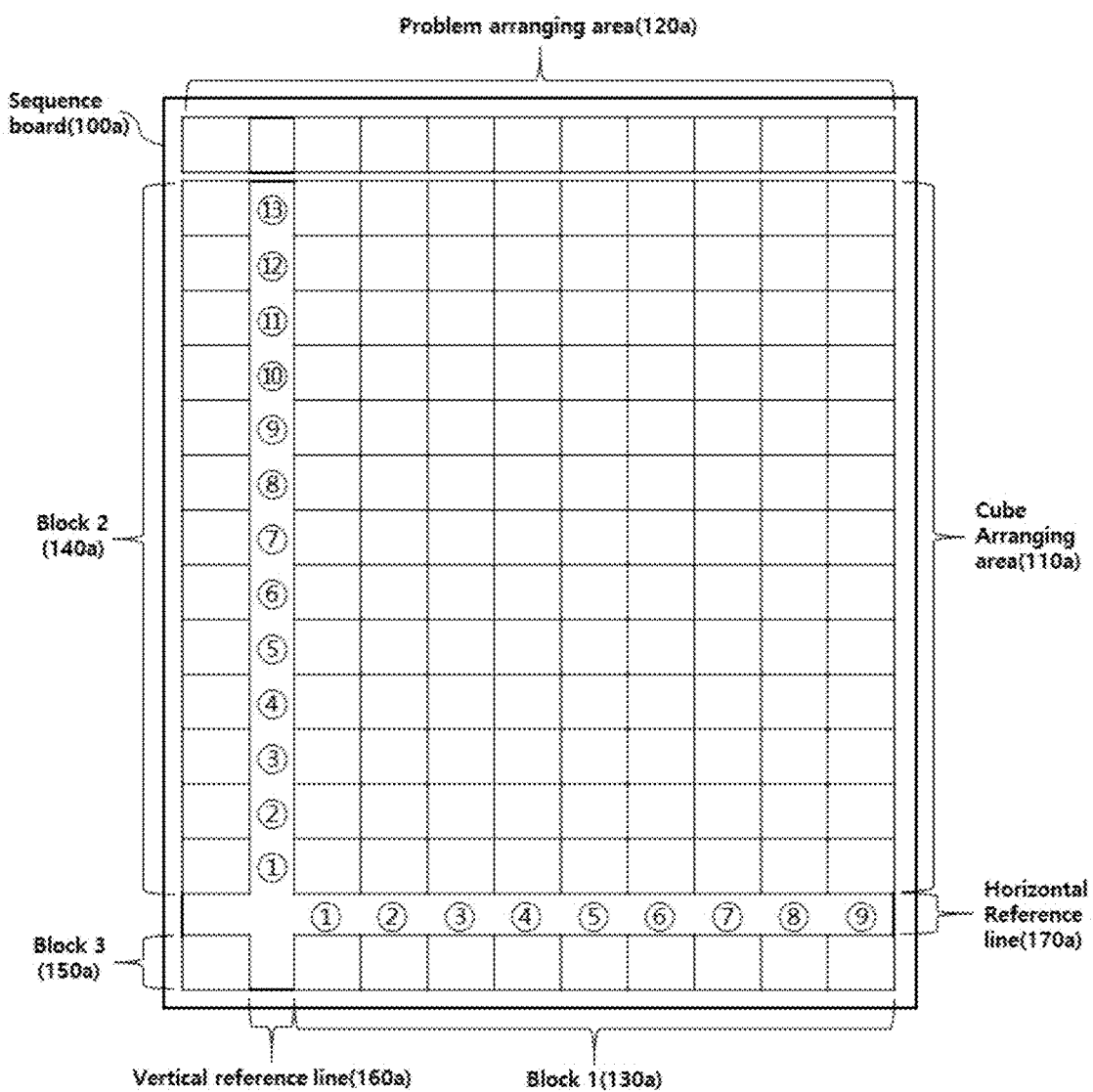
FIG. 11 is a diagram for explaining a sequence board according to an embodiment of the present invention.

FIG. 11 is a diagram illustrating a sequence board according to an embodiment of the present invention.

As illustrated in FIG. 11, a sequence board 100a for computing a mathematical problem according to the embodiment of the present invention is constituted by a plurality of grids having a constant size, and the respective grids are formed in the same size as objects (e.g., cubes, blocks, etc.) to be described below.

Further, the sequence board 100a may be manufactured as various mathematical computing teaching aids including a book, a block, a game machine, or a learning machine, and a user may easily learn a concept of a mathematical problem and a solving process and a solving principle through these teaching aids.

The sequence board 100a includes a total of four blocks and one problem arranging area 120a. The four blocks include a cube arranging area 110a in which a plurality of cubes representing a predetermined number are arranged or rearranged, a second block 140a for adding or subtracting the plurality of cubes positioned in the cube arranging area 110a individually (that is, apiece), a first block 130a for adding or subtracting the plurality of cubes positioned in the cube arranging area 110a by the unit of a row or a column, and a third block 150a formed by a spare space.

The problem arranging area 120a, the cube arranging area 110a, the first block 130a, the second block 140a, and the third block 150a may show different colors, therefore, the user visually and immediately recognize a configuration of the sequence board 100a.

Further, the problem arranging area 120a is a region in which a given mathematical problem (e.g., a sequence) is arranged and represented, and the mathematical problem may be represented through a numeric card representing a number, an operator card representing an operator, or the combinations thereof.

For example, when a given mathematical problem is a sequence of numbers 3, 6, 12, 20, 30, . . . , n, numeric cards corresponding to numbers 3, 6, 12, 20, and 30 are horizontally arranged in the problem arranging area 120a to represent the mathematical problem. In this case, all the numbers included in the sequence need not be represented in the problem arranging area 120a and may be arranged sequentially enough only to find a solution for the corresponding sequence (when the numbers are arranged approximately four to six times, it is enough to find the solution).

On the other hand, the numeric card and the operator card are configured to have the same size as the grid, and the mathematical problem may be represented by using a cube expressing a specific size of number (one, ten, hundred unit, etc.) and a cube expressing a specific operator in addition to the numeric card and the operator card.

Further, the cube arranging area 110a is a zone that allows a mathematical computation to be easily performed by arranging a plurality of cubes or rearranging the existing arranged cubes to simplify the mathematical problem which is represented in the problem arranging area 120a.

Meanwhile, a process of simplifying and computing the mathematical problem through the cube arranging area 110a will be described in detail with reference to the drawings.

In addition, a vertical reference line 160a and a horizontal reference line 170a have a predetermined thickness and protrude on an upper portion of the sequence board 100a.

Further, column numbers and row numbers are assigned to columns and rows at the upper parts of the vertical reference line 160a and the horizontal reference line 170a, and a user may easily determine the number of cubes to be arranged in the cube arranging area 110a and the number of already arranged cubes by referring to the column numbers and the row numbers.

For example, when a plurality of cubes are arranged in four columns (that is, column number 4 of the vertical reference line 160a) and five rows (that is, row number 5 of the horizontal reference line 170a), it is easy to determine that a total of 20 cubes are arranged by referring to the column numbers and the row numbers.

On the other hand, the cube includes an embossing cube representing a positive number or an engraving cube representing a negative number and the embossing cubes, the engraving cubes, or the combinations thereof are arranged or rearranged to simply and easily compute the mathematical problem which is represented in the problem arranging area 120a. In this case, the sequence board 100a may be configured so that when the cube is placed on the sequence board 100a, the cube is recognized as the embossing cube and when the cube is taken out from the sequence board 100a, a space in which the cube is removed from the sequence board 100a is recognized as the engraving cube. This will be described in more detail with further reference to FIG. 5.

The cube arranging area 110a may be configured to include a vertical partition (not illustrated) protruding to the upper portion of the sequence board 100a along a boundary of the column for each grid formed in the sequence board 100a and the plurality of cubes arranged in a row or column direction may be accurately positioned without being disturbed based on the horizontal reference line 170a and the vertical reference line 160a through the partition. Therefore, it is very easy to take out the plurality of cubes from the sequence board 100a along the vertical partition at a time or to arrange the plurality of cubes in the sequence board 100a.

In addition, the sequence board 100a may be made of ethylene vinyl acetate (EVA) as a material which is excellent in flexibility, impact resistance, and self-adhesive property and is harmless to a human body and is environment-friendly and may be manufactured by using various materials acrylonitrile butadiene styrene (ABS), polyvinyl chloride (PVC), wood, plastic, metal, a magnetic body, or a combination thereof in addition to the EVA.

As illustrated in FIG. 5, the engraving cube is shown by a concave three-dimensional cubic shape dug from a plane to the inside and the embossing cube is positioned on the top of the plane and is shown in the form of a convex three-dimensional regular hexahedron.

The engraving cube and the embossing cube are formed in the same size. That is, the engraving cube and the embossing cube are formed in sizes corresponding to each other and one engraving cube and one embossing cube represent numbers having the same size (meaning a size for an absolute value).

In addition, the engraving cube represents the negative number and the embossing cube represents the positive number. For example, when one embossing cube represents +1, one engraving cube corresponding thereto represents −1. On the other hand, the plane (one grid in the case of the sequence board 100a) represents 0 due to the engraving and the embossing canceling each other.

FIG. 5 illustrates that −1+1=0 by representing −1 by the engraving and +1 by the embossing. That is, +1 means adding one embossing cube to the plane (that is, one embossing cube is positioned) and −1 means subtracting one embossing cube from the plane.

Further, the size of the number represented by the embossing cube or the engraving cube may be set differently according to the user, and as a result, the sizes of the numbers represented through the embossing cube and the plane may also vary. However, one engraving cube represents the negative number and one embossing cube represents the positive number corresponding to the engraving cube.

In addition, the engraving cubes and the embossing cubes arranged in the sequence board 100a illustrated in FIG. 5 are shown in a cube shape of the regular hexahedron, but may provided in various three-dimensional figures such as a circle column, a hexagonal column, a circular cone, or the like.

Further, the embossing cube may be separated in half through an inner fastening means (not illustrated), or respective embossing cubes separated in the half may be joined to form one embossing cube. For example, one embossing cube represents +1 and when one embossing cube is separated in half, each of the embossing cubes separated in half represents +½. In addition, −½ may be represented by inserting the separated embossing cube representing the +½ into the engraving cube corresponding to the one embossing cube.

In general, it is assumed that one embossing cube represents a specific number +n and when the embossing cube is separated in half, each of the separated embossing cubes represents +n/2 and when the embossing cube representing +n/2 is inserted into the engraving cube corresponding to the embossing cube, the corresponding engraving cube represents −n/2.

Further, the embossing cube may be joined to or separated from another embossing cube through a fastening means (not illustrating) positioned externally. For example, when the embossing cube representing +1 is joined with another embossing cube, the corresponding embossing cube represents +2 which is twice that. That is, when two embossing cubes representing a specific number n are joined, 2n is represented.

Meanwhile, the sequence board 100a according to the present invention is formed in a cubic shape (for example, a hexahedron configured by a rectangular shape) and the sequence board 100a is formed in such a manner that the engraving cube is formed inside each grid and the embossing cube is inserted into the engraving cube to simplify and compute the mathematical problem as described above. Further, the sequence board 100a may be provided to simplify the mathematical problem by using only the embossing cube without forming the engraving cube inside the grid, thereby easily performing embossing computation on the mathematical problem. In this case, the teaching aids may be configured to further include an engraving plate (not illustrated) so as to express the negative number by taking out the cube apart from the sequence board 100a in order to express the negative number.

As illustrated in FIG. 6, in the present invention, the numbers, the sizes of the numbers, or the combinations thereof may be simply expressed by arranging one or more embossing cubes, one or more engraving cubes, or the combinations thereof.

Since related art that expresses the numbers using the cubes or blocks do not introduce the concepts of the engraving cube and the embossing cube, the concept of the direction needs to be applied to describe both the positive and negative numbers. For example, in order to describe −3 on a vertical line according to the related art, −3 is distinguished from the +3 only when the direction is presented like a cube or a block located on a right side in a reference point (for example, a position having a value of 0). The reason is that lengths of −3 and +3 from the reference point on the vertical line are equal.

However, the present invention provides a framework for sensuously appreciating what the negative or positive number actually means on the vertical line by arranging the engraving cube and the embossing cube in the meaning of the vertical line in order to express the numbers. That is, the engraving cube and the embossing cube mean the negative number and the positive number, respectively and there is no need to apply the concept of directionality. By arranging the plurality of engraving cubes, the plurality of embossing cubes, or combinations thereof, the size of the number may be intuitively recognized.

For example, when one embossing cube represents +1, a case of arranging three embossing cubes means +3 and contrary to this, a case of arranging three engraving cubes corresponding to the embossing cubes means a number −3.

As described above, in the sequence board 100a or the teaching aid using the sequence board 100a, the numbers are expressed by using the engraving cube, the embossing cube, or the combinations thereof to visually easily distinguish whether the corresponding number is the negative number or the positive number and the plurality of engraving cubes, the plurality of embossing cubes, or the combinations thereof are arranged to sensuously and intuitively recognize the size of the corresponding number.

An arithmetic computation may be simply expressed using characteristics of the embossing cubes and the engraving cubes.

For example, in an equation (7−5), since the corresponding equation is a one-dimensional computation, seven embossing cubes representing +1 and five engraving cubes representing −1 are arranged in a line, both numbers +7 and −5 shown in the equation may be expressed. In this case, it may be intuitively recognized that the corresponding equation is (7−5) by expressing the numbers 7 and −5 through the cubes.

In the related arts using the cube (or block), 7 is expressed by using 7 cubes and −5 is expressed by deleting 5 cubes from 7 cubes and to leave only 2 cubes in the case of Equation 7−5, thereby performing the computation of the equation (7−5).

In the computing process of the equation (7−5), when −5 is added to 7, a result thereof becomes 2 and it can be seen that the result is the same as a result of an equation (+7)+(−5) represented by using the engraving cube and the embossing cube of the present invention. It is very meaningful to express (−5) by using the engraving cube. That is, by expressing the number of 7 and the number of subtraction 5 explicitly, there is an effect of simultaneously displaying two numbers.

In general, when using an equation x+5, since x in the equation may be both the positive number and the negative number, it is often necessary to express the x explicitly. Accordingly, when using the engraving cube as described in the present invention, the engraving cube may be used very strongly in the case of factorization, multiplication formula, or general algebra where an unknown number needs to be expressed.

Further, in the process of computing the equation (7−5) through the sequence board 100a using the embossing cubes and the engraving cubes, five embossing cubes out of the seven embosses expressing 7 are inserted into five engraving cubes expressing −5 to form the plane (that is, 0), and as a result, the user may intuitively recognize a solution process and a solution principle of the corresponding equation.

As another embodiment, even when 7*(−5) is expressed and computed, 7*(−5) may be easily computed by arranging or rearranging the embossing cubes and the engraving cubes.

That is, in the case of the equation 7*(−5) (that is, meaning of adding −5 seven times), −5 is expressed by using five engraving cubes and this is repeated seven times and the engraving cubes are arranged in the cube arranging area 110a of the sequence board 100a to easily perform the computing process for the equation. In the end, it may be seen that the result of 7*(−5) is the same as the result of first computing 7*5 and thereafter, affixing (−) and it may be visually recognized that the positive number*the negative number becomes the negative number.

When the computing process is generalized, x*y means adding y by x times (when x is a + value) or subtract the y by x times (when x is a − value). Therefore, in the embodiment, '7*(−5)=(−5)*7' and the equation means that 'add −5 by 7 times'='subtract 7 by 5 times'.

Figure 12:
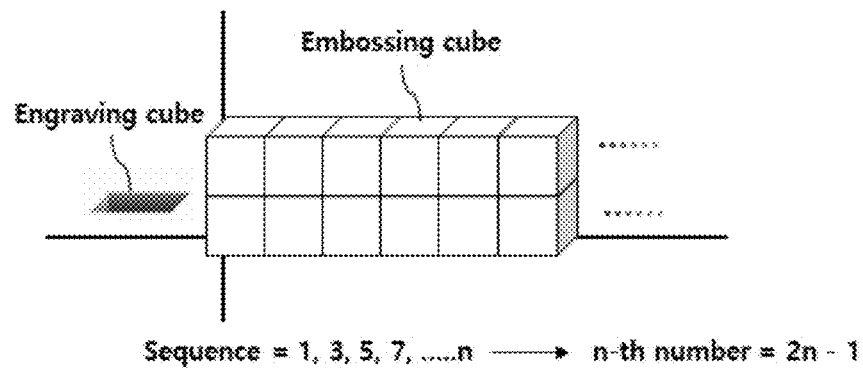
FIG. 12 is a diagram illustrating a process of expressing numerals and mathematical expressions for a one-dimensional sequence using matrices and cubes and computing mathematics thereon according to an embodiment of the present invention.

FIG. 12 is a diagram exemplarily illustrating a process of expressing numbers and equations for a one-dimensional sequence using the sequence board and the cubes and computing mathematics therefor according to an embodiment of the present invention.

As illustrated in FIG. 12, in the case of the one-dimensional sequence in which increase and decrease patterns of the sequence are the same as each other, a number of the one-dimensional sequence is expressed by arranging or rearranging a plurality of cubes (the embossing cubes, the engraving cubes, or the combinations thereof) and the mathematical computation therefor is easily performed to visually recognize the solution principle and the solution process for the corresponding sequence.

Hereinafter, a case where the one-dimensional sequence is 1, 3, 5, 7, 9, . . . n will be described as an example. First, the sequence is incremented by 2, so that it may be known that the sequence is the one-dimensional sequence and all numbers are arranged as the embossing cube.

Further, the user sequentially arranges the numbers shown in the sequence by using the numeric card or the cube by using the numeric card or the cube in the problem arranging area 120a of the sequence board 100a to represent the corresponding sequence.

In addition, the user first arranges cubes corresponding to a first number (that is, a number that is started first) in the direction of the vertical reference line 170a at a position of row number 1 of the horizontal reference line 160a as a process for computing the sequence. That is, since the first number of the sequence is 1, one cube is arranged in the direction of the horizontal reference line 170a from row number 1 of the horizontal reference line 160a.

Then, the user arranges the cubes corresponding to the number of the first number plus the following numbers in the direction of the vertical reference line 170a at a row number position of the next horizontal reference line 160a. Since a second number of the sequence is 3, which is a number obtained by adding 2 to the first number, two cubes are arranged from the position of row number 2 of the horizontal reference line 160a to column number 2 of the vertical reference line 170a. By such a method, the cubes are repeatedly arranged so that the pattern of the entire sequence is determined (generally, the pattern of the sequence may be sufficiently determined approximately 3 to 5 times).

As a result of arranging the plurality of cubes, it can be seen that all of the two cubes are arranged except for an initial set value (that is, the first number).

Accordingly, it is easy to see that the total number of cubes arranged in the cube arranging area 110a is 2*n by adding one embossing cube to the initial set value. However, since the initial set value is 1, the total number of cubes actually arranged is one more. Accordingly, the user may cancel the newly added embossing cube by arranging the engraving cube corresponding to one embossing cubes newly added to the second block 140a.

In this case, in the cube arranging area 110a, 2*n embossing cubes are rearranged, and one engraving cube is arranged in the second block 140a. This allows the user to immediately recognize that the sequence is 2*n−1.

Meanwhile, as described above, it is preferable that the engraving cube is configured to be expressed in the sequence board 100a, but the computing process may be performed by using a separate engraving plate. That is, when one embossing cube is added to the cube arranging area 110a as in the computing process, one embossing cube is brought from the engraving plate and arranged in the cube arranging area 110a to generate one engraving cube corresponding to the embossing cube in the corresponding engraving plate. Then, 2*n cubes (more precisely, embossing cubes) are arranged in the cube arranging area 110a of the sequence board 100a and one engraving cube is generated and arranged in the engraving plate. This allows the user to immediately recognize that the corresponding sequence is 2*n−1.

As another example of the one-dimensional sequence, when the sequence is 3, 5, 7, 9, . . . , n, the increase/decrease pattern of the sequence is +2 and the first number is 3, and as a result, three cubes are arranged on the vertical reference line 160a in row number 1 of the horizontal reference line 170a and thereafter, each of two cubes are arranged in the cube arranging area 110a.

Therefore, in order to easily determine computing result of the entire sequence, when one cube corresponding to the first number is moved to the second block 140a, 2*n cubes are arranged in the corresponding cube arranging area 110a and one cube is arranged in the second block 140a. This allows the user to visually recognize that the sequence is 2*n+1.

As described above, when the sequence which is represented through the problem arranging area 120a is one-dimensional, the cubes are arranged so that the numbers of cubes in the direction of the vertical reference line 170a are the same as each other according to the increase/decrease pattern of the sequence and missing or remaining cubes are arranged in the second block 140a by comparing the first number of the corresponding sequence with the increase/decrease pattern to perform the computing process for the one-dimensional sequence.

Figure 13A:
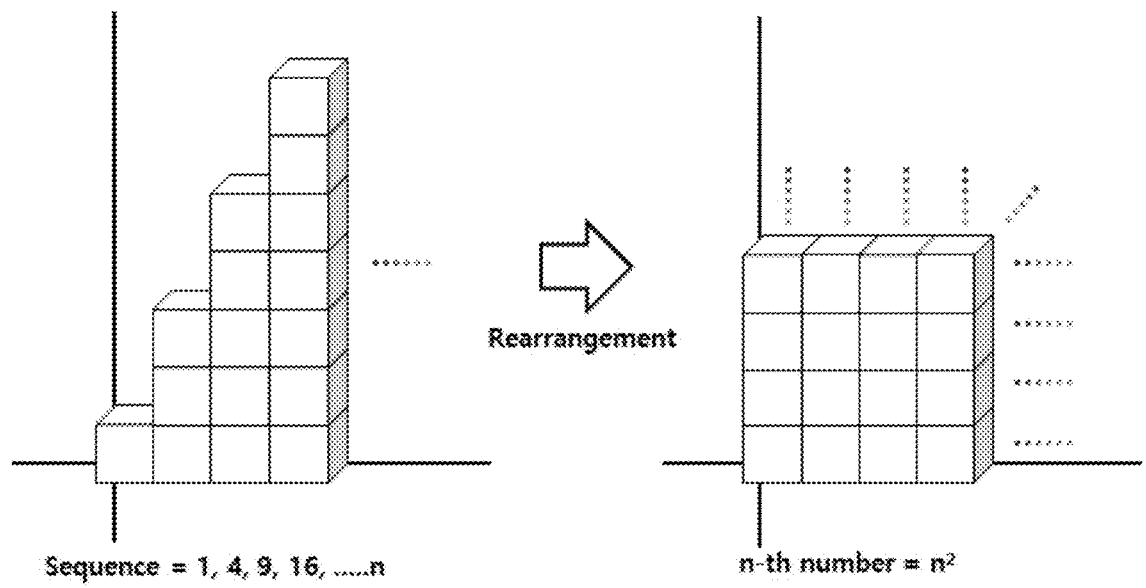
FIG. 13A to FIG. 13C are diagrams for explaining a process of expressing numbers and mathematical expressions for a two-dimensional sequence by using a sequence board and cubes and computing mathematics thereon according to an embodiment of the present invention.
Figure 13B:
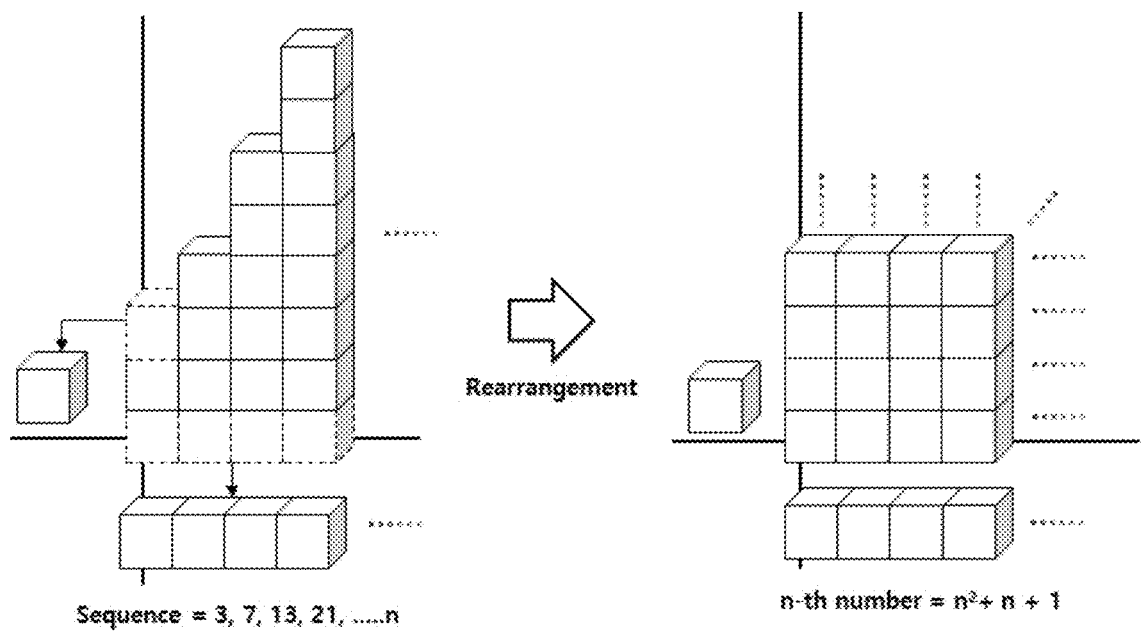
Figure 13C:
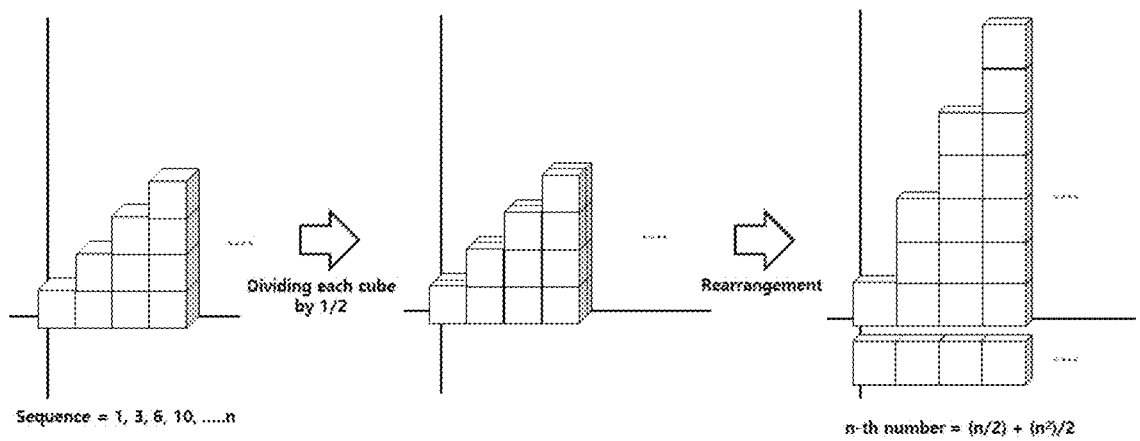

FIG. 13A to FIG. 13C are diagrams exemplarily illustrating a process of expressing numbers and equations for a two-dimensional sequence using the sequence board and the cubes and computing mathematics therefor according to an embodiment of the present invention.

FIG. 13A is a diagram exemplarily illustrating a computing process using the sequence board 100a by using 1, 4, 9, 16, . . . n as an example and a diagram exemplarily illustrating the computing process using the sequence board 100a by using 3, 7, 13, 21, 31, . . . , n as the example. Further, FIG. 13C is a diagram exemplarily illustrating the computing process using the sequence board 100a by using 1, 3, 6, 10, . . . n as the example.

As illustrated in FIG. 13A, since the two-dimensional sequence 1, 4, 9, 16, . . . n has the increase/decrease pattern (all are the positive numbers) of 1, 3, 5, 7, . . . and the first number is 1, one cube is arranged in the cube arranging area 110a of the sequence board 100a in the direction of the vertical reference line 160a in the first row number of the horizontal reference line 170a an then, 3, 5, 7, . . . are arranged in order.

Meanwhile, in a final arrangement state of the cube, it can be seen that there are one cube arranged at an initial stage, and when three are increased, three cubes increased surrounds one cube and the cubes are arranged at 2*2 and in this case, it can be seen that the 5 cubes surround the cubes arranged at 2*2 again to be arranged at 3*3. Accordingly, a plurality of cubes arranged in the cube arranging area 110a may be rearranged into a shape of n*n. Through such a computing process, the n-th number of the two-dimensional sequences 1, 4, 9, 16, . . . , n may be visually and instantly known to be n*n (that is, $n^2$).

On the other hand, when the plurality of cubes sequentially arranged in the cube arranging area 110a is arranged in order of 1, 3, 5, 7, . . . (that is, increased by 2), it is easy to know that the total number of cubes is n*n, and as a result, it is possible to easily compute a two- or three-dimensional sequence using such a pattern.

FIG. 13B is a diagram exemplarily illustrating the computing process using the sequence board 100a by using 3, 7, 13, 21, 31, . . . n as the example.

As illustrated in FIG. 13B, when the sequence 3, 7, 13, 21, 31, . . . , n has the increase/decrease pattern of 4, 6, 8, 10, 12 . . . and the first number is 3, the user arranges three cubes in row number 1 of the horizontal reference line 170a and then, sequentially arranges four, six, eight, ten, twelve cubes, . . . according to the increase/decrease pattern.

Next, the user looks at the increase/decrease pattern of 3, 4, 6, 8, 10, 12 . . . , finds a portion that is not related to the pattern changing by 2, intuitively recognizes that the portion is row number 1 of the horizontal reference line 170a, and moves one cube among three cubes positioned on the horizontal reference line 170a to the second block 140a to rearrange the plurality of cubes arranged in the cube arranging area 110a from 4, 6, 8, 10, 12 . . . to 2, 4, 6, 8, 10 . . . .

Next, the user moves a plurality of cubes arranged in the bottom row to the first block 130a at a time to make the rearranged cubes into 1, 3, 5, 7, 9, . . . to rearrange the plurality of cubes arranged in the cube arranging area 110a.

In this case, the plurality of cubes positioned in the cube arranging area 110a is rearranged in the form of 1, 3, 5, 7, 9, . . . , and it may be easily seen that the sequence is $n^2$. Therefore, referring to one cube moved to the second block 140a and n blocks moved to the first block 130a, the user may immediately recognize that the corresponding sequence is $n^2+n+1$.

FIG. 13C is a diagram exemplarily illustrating the computing process using the sequence board 100a by using 1, 3, 6, 10, . . . , n as the example.

As illustrated in FIG. 13C, since the sequence 1, 3, 6, 10, . . . , n has the increase/decrease pattern of 2, 3, 4, 5, 6 . . . , and the first number is 1, the user sequentially arranges the plurality of cubes in the cube arranging area 110a according to the first number 2 and the increase/decrease pattern. In this case, when each of the cubes is rearranged in half, the (½) cubes are rearranged into 2, 4, 6, 8, . . . .

Herein, when the (½) cubes are subtracted for each column, it can be seen that cubes having a size of (½) are rearranged into 1, 3, 5, 7, 9, . . . in the cube arranging area 110a. Therefore, the user moves the cubes having the (½) size arranged in the bottom row to the first block 130a at a time to make the rearranged (½) cubes into 1, 3, 5, 7, 9, . . . to rearrange the plurality of cubes having the (½) size arranged in the cube arranging area 110a.

In this case, the plurality of cubes having the (½) size positioned in the cube arranging area 110a *is rearranged in the form of* 1, 3, 5, 7, 9, . . . , and it may be easily seen that the sequence is $n^2/2$. Further, referring to n/2 blocks as the number of blocks moved to the first block 130a, the corresponding sequence may be immediately recognized as $n/2+n^2/2$.

Meanwhile, since the three-dimensional sequence 2, 8, 18, . . . , n has the increase/decrease pattern of 6, 10, . . . , and the first number is 2, two cubes are arranged in the cube arranging area 110a of the sequence board 100a in the direction of the vertical reference line 160a in the first row number of the horizontal reference line 170a an then, 6, 10, . . . are arranged in order.

In this case, it is easy to see that cubes having a double size are arranged in the form of 1, 3, 5, 7, 9, . . . when two cubes are combined into one in each column.

Therefore, it is possible to immediately recognize that the n-th number for the three-dimensional sequence 2, 8, 18, . . . , n is $2n^2$.

As described above, in the teaching aids using the sequence board 100a according to the present invention, the plurality of cubes arranged in the cube arranging area 110a are rearranged in the form of 1, 3, 5, 7, 9, . . . , n through the joining and separation processes in the case of the sequence to easily find the solutions for the two-dimensional and three-dimensional sequences and the solution process and the solution principle for sequences for the higher dimensions may be easily recognized and learned through the processes.

FIGS. 8A and 8B are diagrams exemplarily illustrating a process of performing the mathematical computation through the arrangement and rearrangement of the embossing cube and the engraving cube using the sequence board by using a multiplication formula as an example according to an embodiment of the present invention.

As illustrated in FIG. 8A and FIG. 8B, in a process of computing a multiplication formula 77*83 through the sequence board 100a is performed, the corresponding multiplication formula may be first changed by arranging the plurality of cubes to be expressed by a square having the same side length in order to induce the multiplication formula to a multiplication equation. In this case, in a rule for inducing the multiplication formula into the multiplication equation, the same number needs to be increased or decreased based on a certain number. For example, when 77 and 83 are based on 80, 77 is reduced by 3, and 80 is increased by 3.

Next, by using the plurality of embossing cubes and engraving cubes, the corresponding multiplication formula is computed through the arrangement and rearrangement processes in the cube arranging area 110a of the sequence board 100a. In this case, the multiplication formula may be computed by arranging or rearranging cubes having a predetermined size such as a predetermined unit of one unit, ten unit, hundred unit, thousand unit, or the like (for example, 83 may be expressed by using eight ten-unit embossing cubes and three one-unit embossing cubes unit 83).

Herein, 83=80+3. 77=80−3, but 77 may be expressed as 80+(−3) as illustrated in FIG. 8A. As a result, 77*83 is expressed by (80+(−3))*(80+3), so 77*83 consists of 4 blocks in total. That is, 77*83 may be expressed by two embossing cube blocks and two engraving cube blocks. As illustrated in FIG. 8B above, the reason is that a block of the positive number*the negative number is expressed by an engraving cube block and the positive number*the positive number is expressed by an embossing cube block. A first embossing cube block is generated from 80*80 and a second embossing cube block is generated from 80*3 and arranged on a right side of the first embossing block. A first engraving cube block is generated from (−3)*80 and is positioned on the bottom of the first embossing cube block. The size is the same as that of the second embossing cubic block 80*3, but it can be seen that the size is expressed by the engraving. In this case, the second embossing cube block and the first engraving cube block are confronted at an angle of 90 degrees based on a lower right corner of the first embossing cube block. Last, a second engraving cube block is generated from (−3)*3 and arranged at a lower right margin of a first embossing corner.

Further, as illustrated in FIG. 8B, when the engraving cubes and the embossing cubes for the corresponding multiplication formula are arranged using the engraving cubes and the embossing cubes, the second embossing cube block has the same size as the first engraving cube block.

Accordingly, the second embossing cube block is moved and inserted into the first engraving cube block to be cancelled to form the plane and the computing process is finally terminated by using the first embossing cube block and the second engraving cube block which remain.

As described above, the computing process of the multiplication formula may be visually recognized through the arrangement and rearrangement process of the cubes and the solution principle and solution process for the multiplication computation may be easily understood.

Further, as described above, the cube may be separated or joined and a range of the size of the number which may be expressed through the cube may be extended. In addition, by arranging or rearranging the separated or joined cubes, the mathematical problem may be simplified more easily than before the separation or joining or a problem that may not be simplified before the separation or joining may be simplified.

Figure 14:
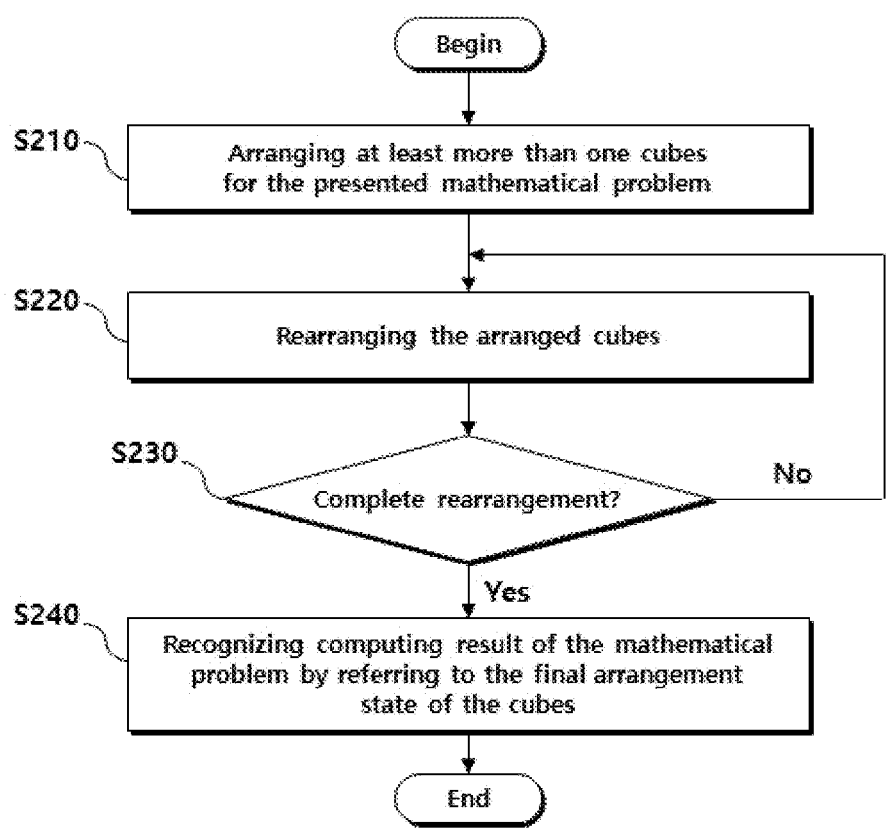
FIG. 14 is a flowchart illustrating a procedure for solving a mathematical problem using a sequence board and cubes according to an embodiment of the present invention.

FIG. 14 is a flowchart illustrating a procedure for solving the mathematical problem using the sequence board and the cubes according to an embodiment of the present invention.

As illustrated in FIG. 14, in a procedure for solving the presented mathematical problem by using the sequence board 100a and the cubes, the user first arranges at least one cube for the mathematical problem presented on the sequence board 100a (S220).

The arrangement is performed by arranging one or more embossing cubes, one or more engraving cubes, or combinations thereof according to the presented mathematical problem.

For example, when the presented mathematical problem is the sequence and the increase/decrease pattern is the positive number, the arrangement may be performed by using only the embossing cube and when the increase/decrease pattern is the negative number, the arrangement may be performed by using only the engraving cube.

On the other hand, the user may represent the presented mathematical problem in the problem arranging area 120a of the sequence board 100a through the numeric card, the operator card, the plurality of cubes, or a combination thereof and express various mathematical problems including the sequence by inserting or taking out the numeric card, the operator card, or the cube.

Next, the user rearranges one or more cubes arranged in the sequence board 100a (S220) to simplify the presented mathematical problem and facilitate the calculation of the mathematical problem through the simplification.

On the other hand, the rearrangement is performed by removing one or more cubes arranged in the sequence board 100a from the sequence board 100a or adding the one or more cubes to the sequence board 100a. Further, the cube may be separated or joined and the range of the size of the number which may be expressed through the cube may be extended. Further, by arranging or rearranging the separated or joined cubes, it is possible to simplify the mathematical problem more easily or simplify a mathematical problem (e.g., a mathematical problem for a sequence of two or more dimensions) which is difficult to simplify, or which may not be simplified.

Further, the arrangement or rearrangement may be performed by placing the cube so that the cube is recognized as the embossing cube in the sequence board 100a or a separate engraving plate or by taking out the cube so that a space where the cube is taken out from the sequence board 100*a* or the separate engraving plate is recognized as the engraving cube.

Next, in step S220, when the simplification process for the mathematical problem is terminated by arranging or rearranging one or more cubes (that is, when the arrangement or rearrangement of the cubes is terminated) (S230), the user recognizes the computing result of the mathematical problem by checking the final arrangement state of the cube (S240).

On the other hand, the recognition is performed by referring to the total number of cubes positioned in the cube arranging area 110*a*, the first block 130*a*, and the second block 140*a* of the sequence board 100*a*.

As described above, the present invention relates to the teaching aids using the sequence board and has an effect in which various mathematical problems are visually expressed by using the engraving cube and the embossing cube to allow the user to sensibly and immediately recognize the mathematical problem.

While the present invention has been particularly shown and described with reference to exemplary embodiments thereof, it is to be understood that the invention is not limited to the disclosed exemplary embodiments and each element of the present invention may be changed or modified within the technical scope of the present invention to achieve the same object and effect.

Moreover, while the present invention has been particularly shown and described with reference to exemplary embodiments thereof, it is clearly understood that the same is by way of illustration and example only and is not to be taken in conjunction with the present invention. It will be understood by those skilled in the art that various changes and modifications may be made by those skilled in the art without departing from the spirit and scope of the present invention. These modifications should not be understood individually from the technical idea or viewpoint of the present invention.

What is claimed is:

1. A device for computing a mathematical problem using an engraving object, an embossing object, or combinations thereof, which comprises:
    an input interface configured to input the mathematical problem;
    a mathematical computing processor configured to perform a mathematical computation for the inputted mathematical problem by using the engraving object, the embossing object, or the combinations thereof; and
    an output interface configured to output the result of the mathematical computation,
    wherein the engraving object is expressed in the form of a concave three-dimensional figure depressed inward from a plane, if an embossing object is inserted to the engraving object and then formed to the plane, the engraving object and the embossing object are visually expressed to be cancelled from the plane, and thus the mathematical computation is intuitively preformed by using the engraving object, the embossing object, or the combinations thereof.

2. The device of claim 1, wherein the mathematical computing processor further configured to:
    recognize the inputted mathematical problem in order to utilize the recognized results to the mathematical computation;
    categorize and arrange the recognized mathematical problem with the engraving object, the embossing object, or the combinations thereof; and
    compute the mathematical problem by using the categorized and arranged engraving object, the embossing object, or the combinations thereof.

3. The device of claim 2, wherein the inputted mathematical problem is recognized by classifying a style of the inputted mathematical problem, and categorizing the components of the inputted mathematical problem, in which the components comprise variable, constant, operator or the combinations thereof; and
    wherein the recognized mathematical problem are categorized and arranged by classifying the recognized mathematical problem into embossing and engraving objects, and by arranging the classified embossing and engraving objects according to the rule corresponding to an operator of the mathematical computation.

4. The device of claim 2, wherein the mathematical computing processor further configured to:
    generate a multimedia contents comprising graphic, video, animation, voice, text or the combinations thereof, for processes or results computing the inputted mathematical problem; and
    output the generated multimedia contents comprising visual information, auditory information, tactile information, electrical signal, or the combinations thereof.

5. A platform for computing a mathematical problem using an engraving object, an embossing object, or combinations thereof, which is configured to:
    recognize the mathematical problem as input, and perform the mathematical computation for the recognized mathematical problem by using the engraving object, the embossing object, or the combinations thereof; and
    output the processes and results for the mathematical computation;
    wherein the engraving object is expressed in the form of a concave three-dimensional figure depressed inward from a plane, if an embossing object is inserted to the engraving object and then formed to the plane, the engraving object and the embossing object are visually expressed to be cancelled from the plane, and
    the platform provides development environment to develop a mathematical computation service program using the engraving object through an application program interface, or provides a developed mathematical computation service.

6. A teaching aid for computing a mathematical problem using an engraving object, which comprises:
    a teaching aid configured to compute a mathematical computation for the mathematical problem using the engraving object, an embossing object, or combinations thereof,
    wherein the teaching aid is made of paper, metal, wood, synthetic resin, or the combinations thereof;
    the teaching aid comprises a book, a block, a game machine, a learning machine, or the combinations thereof; and
    the engraving object is expressed in the form of a concave three-dimensional figure depressed inward from a plane, if an embossing object is inserted to the engraving object and then formed to the plane, the engraving object and the embossing object are visually expressed to be cancelled from the plane, and thus the teaching aid intuitively displays the principle of the mathematical computation used in an computational process of computing the mathematical problem by utilizing the engraving object, the embossing object, or the combinations thereof.

7. The teaching aid of claim 6, which comprises:
at least more than one of cubes as objects; and
a sequence board needed to perform the mathematical computation for the mathematical problem,
wherein the mathematical problem is simplified through the arrangement of the cubes.

8. The teaching aid of claim 7, wherein the sequence board is made up of EVA (ethylene vinyl acetate), ABS (acrylonitrile butadiene styrene), PVC (polyvinyl chloride), magnetic material, metal, wood, paper, plastic, or the combinations thereof.

9. The teaching aid of claim 7, wherein the cubes comprise an embossing cube representing a positive number, and an engraving cube representing a negative number.

10. The teaching tool of claim 9, wherein the teaching aid represents a number, size of a number or the combinations thereof by using the embossing cube, the engraving cube or the combinations thereof.

11. The teaching aid of claim 7, wherein the mathematical problem is simplified through the arrangement and rearrangement of the cubes,
wherein the arrangement is to place at least one or more cubes according to the given mathematical problem, and the rearrangement is to remove at least one or more arranged cubes on the sequence board or to add at least one or more arranged cubes on the sequence board.

12. The teaching aid of claim 7, wherein the range of numbers that can be represented can be expanded by separating and combining the cubes, and arranging or rearranging the separated and combined cubes makes it possible to simplify the mathematical problem more easily than before separating and combining the mathematical problem, or simplify the mathematical problem that could not be simplified before separating or combining the cubes.

13. The teaching aid of claim 7, wherein when the cube is protruding outward from the plane on the sequence board, the cube is represented to an embossing cube, and when the cube is taken out from the sequence board which is shaped inwardly caved in the plane, the space where the cube is removed from the sequence board is represented to an engraving cube.

14. The teaching aid of claim 7, which further comprises:
an engraving board constructed to represent a negative number by picking out the cube from the engraving board in addition to the sequence board.

15. The teaching aid of claim 7, wherein the sequence board is configured to comprise:
a cube array area for arranging cubes;
a first block for adding or subtracting cubes in rows;
a second block for adding or subtracting cubes individually; and
a problem arranging area for expressing the presented mathematical problem.

* * * * *